United States Patent [19]
Arbiter

[11] Patent Number: 5,902,977
[45] Date of Patent: May 11, 1999

[54] FLOTATION CELL AND METHOD

[75] Inventor: Nathaniel Arbiter, Vail, Ariz.

[73] Assignee: COPROCO Development Corporation, Denver, Colo.

[21] Appl. No.: 08/891,946

[22] Filed: Jul. 14, 1997

Related U.S. Application Data

[60] Division of application No. 08/502,524, Jul. 14, 1995, Pat. No. 5,807,479, which is a continuation-in-part of application No. 08/275,997, Jul. 15, 1994, Pat. No. 5,795,465.

[51] Int. Cl.$^6$ .............. B03D 1/16; B03D 1/02; B03D 1/24; B03D 1/26
[52] U.S. Cl. .............. 209/169; 209/166; 209/170; 423/26
[58] Field of Search ................. 209/164, 168, 209/169, 170, 166; 423/26

[56] References Cited

U.S. PATENT DOCUMENTS

| | | |
|---|---|---|
| 755,302 | 3/1904 | Le Sueur . |
| 1,131,986 | 3/1915 | Benedict . |
| 1,232,080 | 7/1917 | Pope et al. . |
| 1,283,159 | 10/1918 | Groch . |
| 1,314,316 | 8/1919 | Flinn . |
| 1,374,446 | 4/1921 | Greenawalt . |
| 1,374,499 | 4/1921 | Greenawalt . |
| 1,402,099 | 1/1922 | Shimmin et al. . |
| 1,471,332 | 10/1923 | Greenawalt . |
| 1,570,858 | 1/1926 | Perkins . |
| 1,598,296 | 8/1926 | MacKay . |
| 1,728,352 | 9/1929 | Lowe . |
| 1,841,438 | 1/1932 | Greenawalt . |
| 1,881,412 | 10/1932 | MacCamy . |
| 2,012,830 | 8/1935 | Ralston . |
| 2,130,278 | 9/1938 | Keyes . |
| 2,141,862 | 12/1938 | Hall . |
| 2,148,446 | 2/1939 | Drake . |
| 2,202,484 | 5/1940 | Emery . |
| 2,226,170 | 12/1940 | Lasseter . |
| 2,647,827 | 8/1953 | McGauley . |
| 2,726,934 | 12/1955 | Forward . |
| 2,727,818 | 12/1955 | Kenny et al. . |
| 2,727,819 | 12/1955 | Kenny et al. . |
| 2,730,493 | 1/1956 | Carlson . |
| 2,807,533 | 9/1957 | Abramson . |
| 2,927,017 | 3/1960 | Marvin . |
| 2,928,543 | 3/1960 | Logue . |
| 2,928,732 | 3/1960 | Bare et al. . |
| 3,071,447 | 1/1963 | Bernhardi . |
| 3,202,281 | 8/1965 | Weston . |
| 3,393,802 | 7/1968 | Logue . |
| 3,544,306 | 12/1970 | McGauley . |
| 3,583,867 | 6/1971 | Slominski et al. . |
| 3,753,691 | 8/1973 | Grover et al. . |
| 3,847,357 | 11/1974 | Weston . |

(List continued on next page.)

FOREIGN PATENT DOCUMENTS

| | | |
|---|---|---|
| 52-14546 | 4/1977 | Japan . |
| 590264 | 2/1978 | U.S.S.R. . |

OTHER PUBLICATIONS

Biswas & Davenport, "Extractive Metallurgy of Copper", ch. 3, pp. 61–79, (1980).
Taggart, Wiley & Long, "Froth Flotation", Handbook Of Mineral Dressing, 1945.

*Primary Examiner*—Thomas M. Lithgow
*Attorney, Agent, or Firm*—Sheridan Ross P.C.

[57] ABSTRACT

The present invention provides a process that employs both non-selective flotation and oxidative leaching of the resulting concentrates to recover an increased amount of copper from porphyry copper ores. The non-selective flotation step uses collectors and conditions, such as pH, that are conducive to the strong flotation of sulfide minerals generally. In the oxidative leach, the copper sulfide minerals in the concentrate fraction are oxidized to copper compounds, which are soluble in the leach solution. The oxidative leach includes the use of ammonia and sulfite under agitation leaching conditions to convert the copper sulfide minerals into ammonia soluble forms.

15 Claims, 11 Drawing Sheets

5,902,977
Page 2

U.S. PATENT DOCUMENTS

| | | |
|---|---|---|
| 3,902,896 | 9/1975 | Borbely et al. |
| 3,909,248 | 9/1975 | Ryan et al. |
| 3,964,901 | 6/1976 | Swinkels et al. |
| 4,011,072 | 3/1977 | Holman et al. |
| 4,022,866 | 5/1977 | Kuhn et al. |
| 4,024,218 | 5/1977 | McKay et al. |
| 4,115,221 | 9/1978 | Wadsworth et al. |
| 4,132,758 | 1/1979 | Frankiewicz et al. |
| 4,138,248 | 2/1979 | Narain |
| 4,153,522 | 5/1979 | Arbiter |
| 4,165,264 | 8/1979 | Satchell, Jr. |
| 4,331,635 | 5/1982 | Arbiter et al. |
| 4,490,248 | 12/1984 | Filippov |
| 4,545,963 | 10/1985 | Weir et al. |
| 4,585,549 | 4/1986 | Malghan |
| 4,960,509 | 10/1990 | McNeill |
| 4,971,662 | 11/1990 | Sawyer et al. |
| 5,110,455 | 5/1992 | Huch |
| 5,176,802 | 1/1993 | Duyvesteyn et al. |
| 5,431,788 | 7/1995 | Jones |

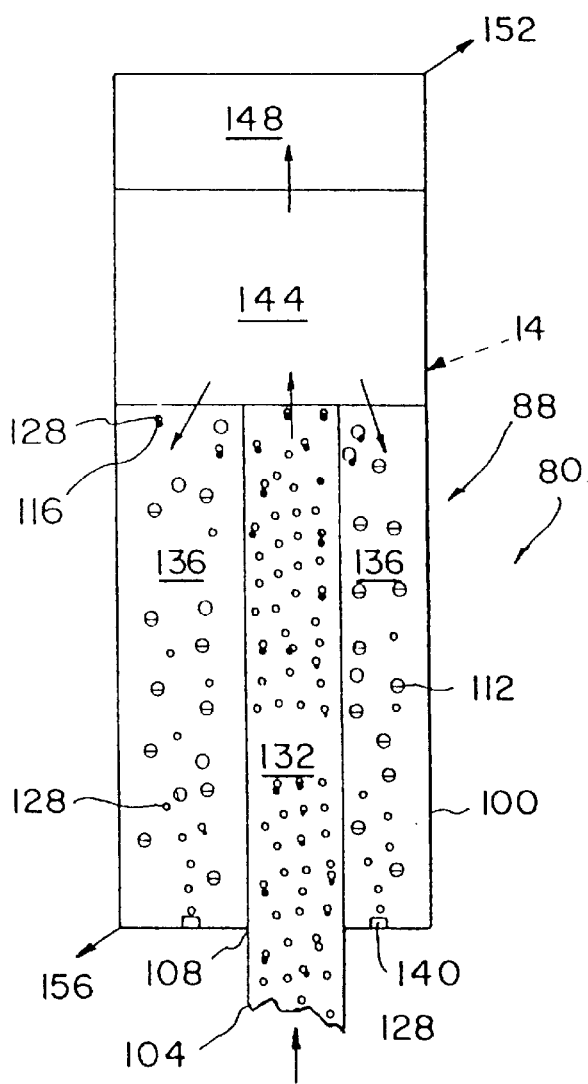
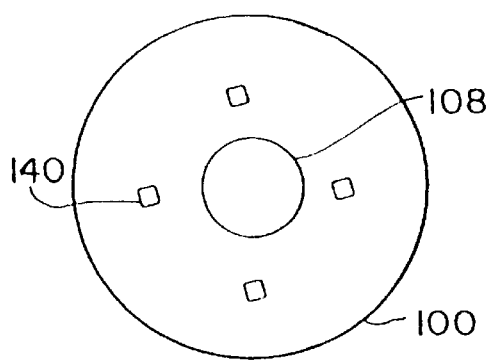
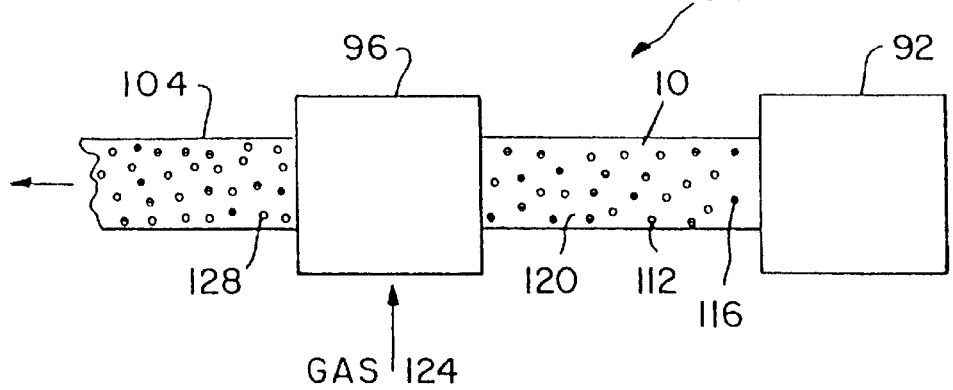

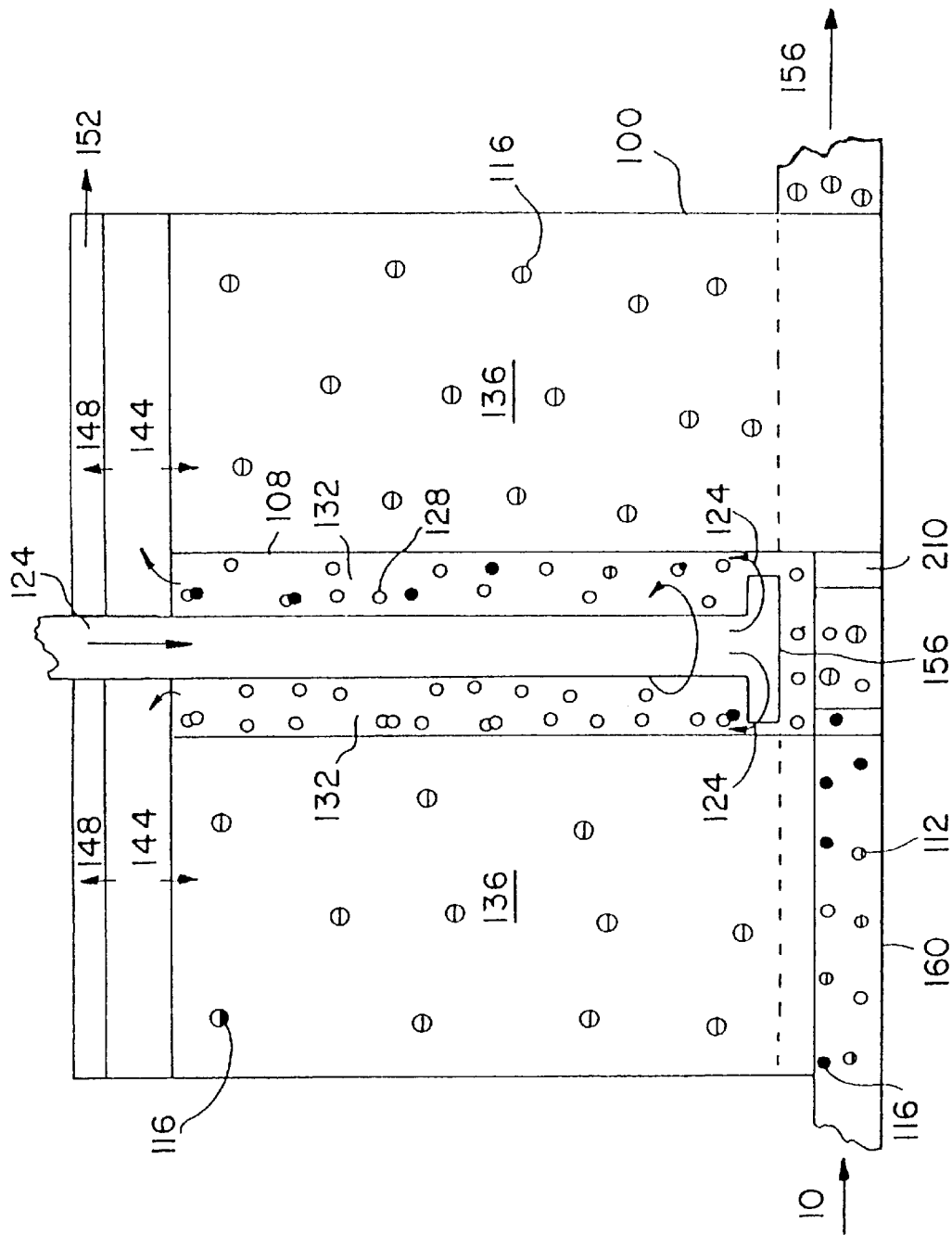

FLOTATION CELL AND METHOD

The present application is a divisional of U.S. application Ser. No. 08/502,524, filed on Jul. 14, 1995, for "Process for Recovering Copper from Copper-Containing Material" (now U.S. Pat. No. 5,807,479) and a continuation-in-part of U.S. patent application Ser. No. 08/275,997 for "Process for Recovering Copper from Copper-Containing Material", filed Jul. 15, 1994(now U.S. Pat. No. 5,795,465), and incorporated herein by this reference in its entirety.

FIELD OF THE INVENTION

The present invention relates to a process for recovering copper from copper-containing material and specifically to a process for recovering copper from copper oxide and sulfide ores, concentrates, and tailings.

BACKGROUND OF THE INVENTION

The vast majority of the world's copper resources are in the form of low-grade (e.g., assaying less than about 1% copper) porphyry copper deposits. In porphyry copper deposits, copper occurs primarily as a copper sulfide and in particular chalcopyrite ($CuFeS_2$) or chalcocite ($Cu_2S$). A sulfide is a compound in which a metal, such as copper, is bonded to one or more sulfur atoms. Other copper sulfides include bornite and covellite.

As a result of post-deposition oxidation of chalcopyrite, deposits typically are zoned with the shallower portions containing copper oxides underlain by chalcocite and the deeper portion containing chalcopyrite with little or no copper oxides or chalcocite. An oxide is a compound in which a metal, such as copper, is bonded to one or more oxygen atoms. Copper oxides include chrysocolla, malachite, cuprite and azurite.

Porphyry copper deposits typically contain other types of minerals associated with the copper minerals. For example, porphyry copper deposits typically contain a significant but highly variable amount of other sulfides associated with copper sulfides, particularly pyrite.

Post-deposition oxidation of the deposit causes the ore to have different proportions of chalcocite, chalcopyrite, other sulfides and copper oxides in the shallower portions of the deposit. The high degree of variability in the proportions of the copper sulfides and copper oxides throughout the deposit renders it difficult and costly to selectively mine copper oxides from copper sulfides such as chalcocite and chalcopyrite.

Different techniques are employed to recover copper from chalcocite and chalcopyrite on the one hand and copper oxides on the other. For copper sulfides, flotation processes are widely used to separate copper sulfides from copper oxides and the remaining ore materials, with the copper in the copper sulfides being recovered by smelting. In contrast, ores predominantly containing copper in the form of copper oxides are typically leached by heap leaching techniques to solubilize the copper oxides.

Flotation processes generally separate the copper sulfides from other sulfides and copper oxides by collecting the copper sulfides in the flotation froth. The froth is removed as a concentrate to be treated by a smelter and the residue is removed as tailings for discard. To form the concentrate, air bubbles are passed through a slurry containing ore particles to form the froth containing air bubbles attached to particles having exposed copper sulfide minerals. The necessary hydrophobic properties of the copper sulfide minerals can be established and recovery of copper sulfides obtained by contacting the slurry with a collector. Typically, the collector contains a hydrocarbon radical attached to a polar group. The polar group attaches to the copper sulfide mineral surface and the hydrocarbon radical which attaches to an air bubble. The particles containing exposed copper sulfide minerals attached to a collector are carried upward by the air bubbles to the froth. The particles in the tailings remain in the flotation cell contents for discharge.

The flotation process generally involves a significant loss of copper to the tailings because of the need to produce a concentrate for treatment by a smelter. Smelters generally require concentrates to assay at least 25% copper to obtain acceptable technical and economic results. To produce such a concentrate, the flotation process is usually designed to include in the concentrate only particles containing higher proportions of copper. To realize such a result, selective collectors and specific flotation conditions are used to recover higher grade particles while suppressing the recovery of lower-grade particles that would reduce the concentrate assay to less than 25% copper. Selective collectors preferentially attach to copper sulfide minerals and not to other sulfides. While residence times in the flotation circuit can be reduced to suppress the recovery of lower-grade particles, this can also cause the loss of slower floating, higher-grade particles. Smelter grade requirements higher than 25% would require even more lower grade particles to be discharged in the tailings. In flotation processes, copper losses also result from the inability of the collector to attach to copper oxide minerals.

Copper loss by flotation processes is significant. In 1991, for example, copper flotation plants in the U.S. recovered about 1.19 million metric tons of copper in concentrate fractions with a copper recovery of about 83%, and an estimated loss in the tailings fraction of about 228,100 metric tons of copper. Chilean government-owned copper mining operations recovered approximately 1.055 million metric tons of copper, with approximately 247,200 metric tons estimated to be lost in the tailings fraction. Additional losses of potentially valuable materials are incurred by the discard of pyrite and other sulfides.

There is a need to provide a methodology for selecting a process for recovering copper from copper-containing material that is appropriate for the specific composition of the copper-containing material, especially for materials containing variable amounts of copper sulfides and oxides and other minerals.

There is a need to provide a flotation process that provides increased recovery of copper from copper-containing materials. There is a related need to provide such a process that can be incorporated into existing flotation operations.

There is a need to provide a process that recovers an increased amount of copper in the concentrate fraction. There is a related need to provide a process that recovers the copper in both copper sulfide and copper oxide minerals.

There is a need to provide a process that can economically recover copper from a lower grade material (e.g., ore or hydrometallurgical tailing), which cannot be upgraded to smelter requirements.

There is a need to provide a process that recovers copper from a concentrate fraction by techniques other than smelting.

SUMMARY OF THE INVENTION

In accordance with one embodiment of the present invention, a process is provided that includes non-selective flotation to recover copper from copper sulfides and oxides in a copper-containing material. As used herein, "non-selective flotation" refers to flotation under conditions conducive to the strong flotation of sulfide minerals generally, including copper sulfide minerals, iron sulfide, particularly pyrite, and mixtures thereof. "Selective flotation" refers to flotation under conditions that float copper sulfides but suppress the flotation of other sulfides, particularly iron pyrite.

A copper-containing material preferably contains a copper sulfide. A preferred copper-containing material is a porphyry copper ore and derivatives thereof (e.g., tailing fractions, concentrate fractions, etc.). Commercial copper ores currently contain from about 0.5% to about 2% copper. The copper-containing material can contain not only copper sulfide minerals such as chalcocite and/or chalcopyrite but also copper oxide minerals. As will be appreciated, copper-containing materials include ores, concentrates, and tailings.

A majority of the copper in the copper-containing material preferably is in the form of copper sulfides, mainly chalcopyrite and chalcocite, and mixtures thereof. More preferably, at least about 90% of the copper in the copper-containing material is in the form of copper sulfides and no more than about 10% of the copper in the copper-containing material is in the form of copper oxides.

An embodiment of the process of the present invention includes the following steps: (i) non-selectively floating a portion of the copper-containing material with a collector selected from the group consisting of a xanthate, xanthate ester and mixtures thereof and at a pH from about pH 7.5 to about pH 10.5 to form a non-selective flotation tailings fraction and a non-selective flotation concentrate fraction; and (ii) recovering the copper from the non-selective flotation concentrate fraction. The process can further include the additional steps of contacting a portion of the non-selective flotation concentrate fraction with a leach solution; agitating the leach solution at a temperature and for a time sufficient to solubilize a substantial portion of the copper in the non-selective flotation concentrate fraction; passing an oxygen-containing gas through the leach solution during the agitating step to oxidize a substantial portion of copper sulfides in the non-selective flotation concentrate fraction; and/or calcining the non-selective flotation concentrate fraction.

The preferred collector in step (i) is selected from the group consisting of amyl xanthate and hexyl xanthate or an ester thereof. The collector preferably has a concentration in a slurry of the copper-containing material in step (i) in the range from about 0.02 to about 0.10 lbs/ton.

The slurry can include various other reagents to facilitate non-selective flotation. For example, the slurry can include a neutral oil to increase the hydrophobicity of the collector.

The non-selective flotation concentrate normally recovers most of the sulfide minerals contained in the copper-containing material. Preferably, at least about 50%, more preferably at least about 75%, and most preferably at least about 90% of the copper is in the non-selective flotation concentrate fraction. Preferably, at least about 50%, more preferably at least about 75%, and most preferably at least about 90% of the sulfides other than copper sulfides are generally in the non-selective flotation concentrate fraction.

The leach solution can include a leaching agent to solubilize the copper in the non-selective flotation concentrate fraction. The leaching agent is preferably a sulfuric acid solution or an ammoniacal solution.

In one embodiment, the leach solution includes ammonia as the leaching agent and ammonium sulfite to convert copper sulfides in the copper-containing material to a product that is soluble in the leaching agent. The ammonia leaching agent preferably has a total concentration in the leach solution in the range from about 100 to about 150 gms/liter. The concentration of the ammonium sulfite in the leach solution is preferably in the range from about 50 to about 150 gms/liter.

In this embodiment, the leach solution preferably has a pH ranging from about pH 9 to about pH 10 and a temperature ranging from about 20 to about 40° C.

The byproduct of the oxidation, ammonium sulfate, can be converted into sulfuric acid and ammonia by the following steps: (i) passing an electric current between an anode and a cathode in the leach solution; (ii) converting the ammonium sulfate into ammonium and sulfate ions; (iii) separating the ammonium ions from the sulfate ions; (iv) forming at the cathode oxygen gas and hydrosulfuric acid; and (v) forming at the anode hydrogen gas and ammonia.

In other embodiments, the process includes additional steps. One embodiment of the process includes the step of selectively floating a portion of the non-selective flotation concentrate fraction to form a selective cleaner flotation concentrate fraction and a selective cleaner flotation tailings fraction. The selective flotation cleaner scavenger tailings fraction is subjected to the contacting and/or agitating steps to recover the copper therein. Another embodiment includes the step of leaching a portion of the copper-containing material to form a leaching solution containing dissolved copper and a leaching residue. The leaching residue is non-selectively floated. The leaching step before non-selective flotation is typically employed to solubilize copper oxides present at assays above about 0.2% copper from the copper-containing material.

Another embodiment of the present invention provides a process for the recovery of copper from copper-containing material, including the steps of: (i) selectively floating the copper-containing material to form a selective rougher flotation concentrate fraction and a selective rougher flotation tailings fraction; (ii) selectively floating the selective rougher flotation concentrate fraction to form a selective cleaner flotation concentrate fraction and a selective cleaner flotation tailings fraction; (iii) non-selectively floating the selective rougher flotation tailings fraction in the presence of a collector selected from the group consisting of a xanthate, xanthate ester, and mixtures thereof, and at a pH in the range from about pH 7.5 to about pH 10.5 to form a non-selective flotation concentrate fraction and a non-selective flotation tailings fraction; and (iv) recovering copper from the selective and non-selective flotation concentrate fractions. The embodiment can include additional steps, including contacting the selective cleaner flotation tailings and non-selective flotation concentrate fractions with a leach solution and/or agitating the leach solution at a temperature and for a time sufficient to solubilize the copper in the selective cleaner flotation tailings and non-selective flotation concentrate fractions and recovering the copper from the leach solution.

The present invention can overcome limitations typically encountered in conventional selective flotation processes. One embodiment of the present invention does not require a smelter to recover copper. The non-selective flotation and oxidative leach steps provide for copper metal recovery without smelting. This embodiment avoids high smelter charges and environmental problems associated with smelters.

Another embodiment provides a high grade selective cleaner flotation concentrate fraction suitable for a smelter but recovers an increased amount of the copper sulfide and oxide minerals from the selective flotation tailings fractions. Selective flotation processes typically lose all copper in the rougher and cleaner scavenger tailings fractions.

Another embodiment provides non-selective flotation conditions which can be conducive to the recovery of copper oxide minerals. The non-selective flotation conditions further assist flotation of the copper oxide minerals by floating the sulfide minerals associated with copper oxide minerals. Selective flotation processes typically fail to recover copper oxide minerals.

Another embodiment provides a process to treat copper-containing materials containing mixtures of copper sulfides, such as chalcocite and chalcopyrite, and copper oxides.

The present invention further includes an improved flotation device. The flotation device includes: (i) a flotation vessel; (ii) an input into the vessel for a liquid feedstream containing particles; (iii) a first output from the vessel for a treated feedstream; (iv) a second output from the vessel for a product stream; (iv) a device for contacting the liquid feedstream with a gas in communication with the input to form a plurality of bubbles in the liquid feedstream; and (v) a device for confining the liquid feedstream in a mixing zone located within the flotation vessel. The confining device communicates with the input and the contacting device to cause the particles to contact the bubbles forming a gas-containing liquid feedstream and a froth at an upper end of the vessel. The confining device discharges the gas-containing liquid feedstream into the vessel at a point below the froth to form a subfroth region.

The mixing zone significantly improves metal recoveries compared to existing cells by forcing contact between the gas bubbles and the particles. Typically, the mixing zone contains from about 25 to about 35% by volume gas.

The discharge from the mixing zone forms a subfroth below the froth. The subfroth also has a relatively high amount of gas relative to the amount of gas present below the froth in existing cells. Typically, the subfroth contains from about 35 to about 65% by volume gas. The subfroth significantly enhances metal recoveries by forcing gas bubbles to contact the particles.

The confining device defines the mixing zone by having a relatively limited volume for the bubbles and particles to interact. Typically, the volume of the confining device ranges from about 1 to about 30% of the total vessel volume.

In operation, one embodiment of the cell (i) contacts a liquid feedstream containing hydrophilic and hydrophobic particles with a gas to form a gas-containing liquid feedstream; (ii) discharges the gas-containing liquid feedstream into a portion of the flotation vessel; (iii) first introduces a first portion of the gas-containing liquid feedstream into the subfroth; (iv) second introduces a second portion of the gas-containing liquid feedstream into the froth; and (v) separates the froth from the subfroth to form the product stream.

BRIEF DESCRIPTION OF THE DRAWINGS

FIG. 9 is a cross-sectional view of an embodiment of a flotation cell;

FIG. 10 is a top view of the flotation cell in FIG. 9; and

FIGS. 11 and 12 are cross-sectional and top views, respectively, of another embodiment of a flotation cell.

DETAILED DESCRIPTION

Selection of Copper Recovery Process

The present invention is based in part on the recognition that the mineralization and texture of a copper-containing material determine the preferred copper recovery process. This is especially applicable to mixed copper sulfide and oxide materials. The mineralogy refers to the chemical composition of the primary mineral containing the copper. More specifically, the mineralogy classification is based upon the chemical composition of the copper-containing mineral that constitutes no less than a majority of the copper mineralization in the copper-containing material. More preferably, the mineralogy composition is based upon the chemical composition of the copper-containing mineral that constitutes no less than 50% by weight of the copper mineralization in the copper-containing material.

The mineralogy controls the process type used to recover copper from the copper-containing material. By way of example, chalcocite but not chalcopyrite is readily oxidized in an oxidative leach step to a soluble form. Chalcopyrite preferably is oxidized by calcining before leaching is conducted. Copper oxides but not copper sulfides are readily solubilized by an acid leach (without further oxidation).

The texture of the copper-containing material refers to the grain size of the copper mineralization and the degree of intimacy of the association between the copper sulfides and oxides and other sulfides. Coarse texture refers to copper mineralization that may be substantially liberated by comminuting the copper-containing material to about 35 to about 65 mesh (Tyler) ; fine texture may be substantially liberated by comminuting the copper-containing material to about 100 to about 200 mesh (Tyler) ; and very fine texture may be substantially liberated by comminuting the copper-containing material to about 200 to about 325 mesh (Tyler). The intimate association of other sulfides with copper sulfides and oxides can decrease the ability to liberate the copper minerals by comminution techniques. As used herein, "substantial liberation" refers to copper recoveries no less than about 30% using selective flotation techniques described below.

Unlike mineralogy which determines the techniques used to oxidize and/or solubilize the copper sulfides and oxides, the texture determines the process used to separate the copper mineralization from the remaining material in the copper-containing material. For both chalcocite and chalcopyrite, coarse textured copper-containing material is concentrated by selective flotation techniques as discussed below. For fine textures, the copper-containing material can be treated either by selective or non-selective flotation techniques. For very fine textures the copper-containing material is concentrated by non-selective flotation techniques as discussed below.

Figure 1:
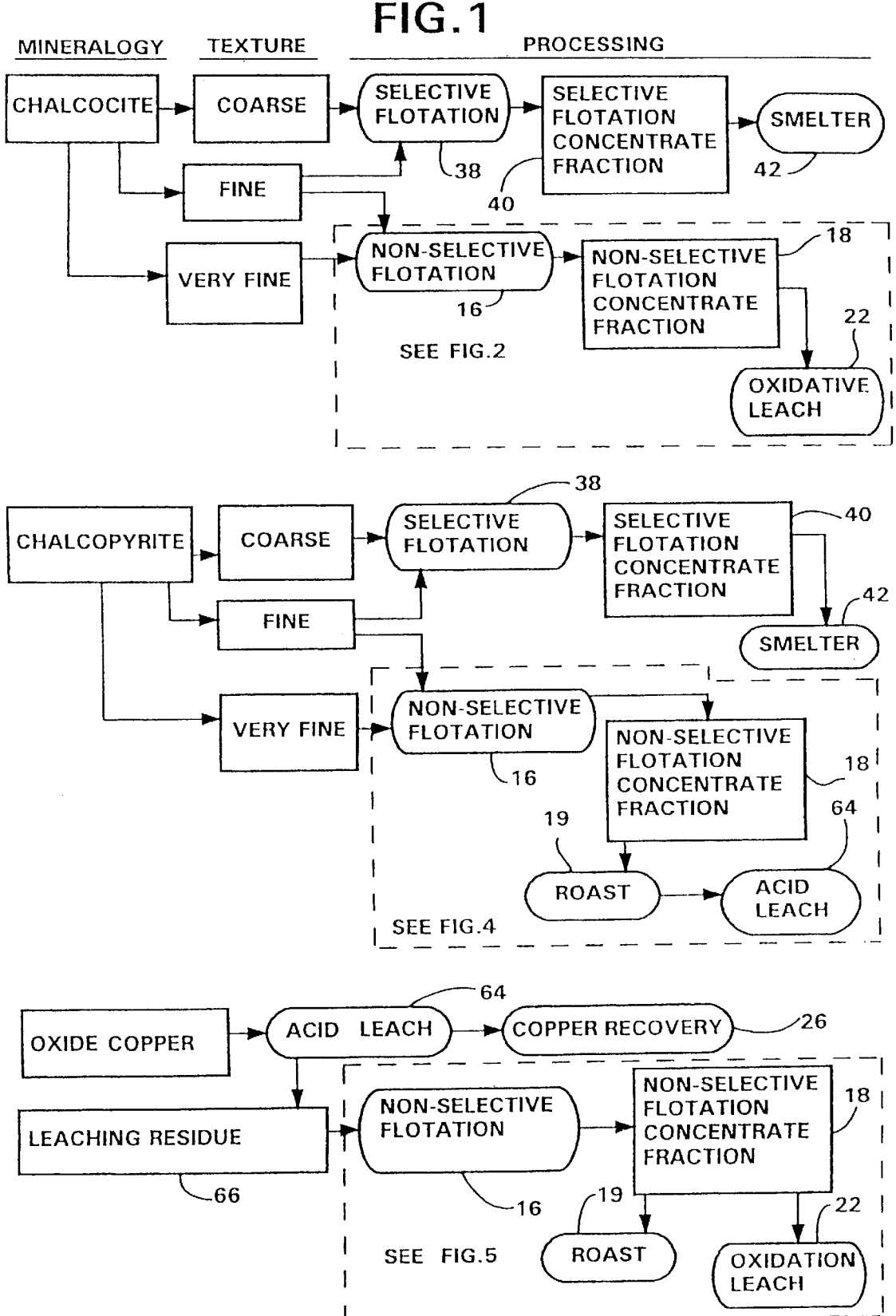
FIG. 1 is a flow schematic of several embodiments of the present invention.

FIG. 1 depicts the methodology for selecting a preferred copper recovery process based on mineralogy and texture. A different set of processes is depicted for chalcocite, chalcopyrite, and copper oxides. For chalcocite and chalcopyrite there is a corresponding coarse texture, fine texture and very fine texture. For each texture, the corresponding copper recovery process is illustrated.

Figure 5:
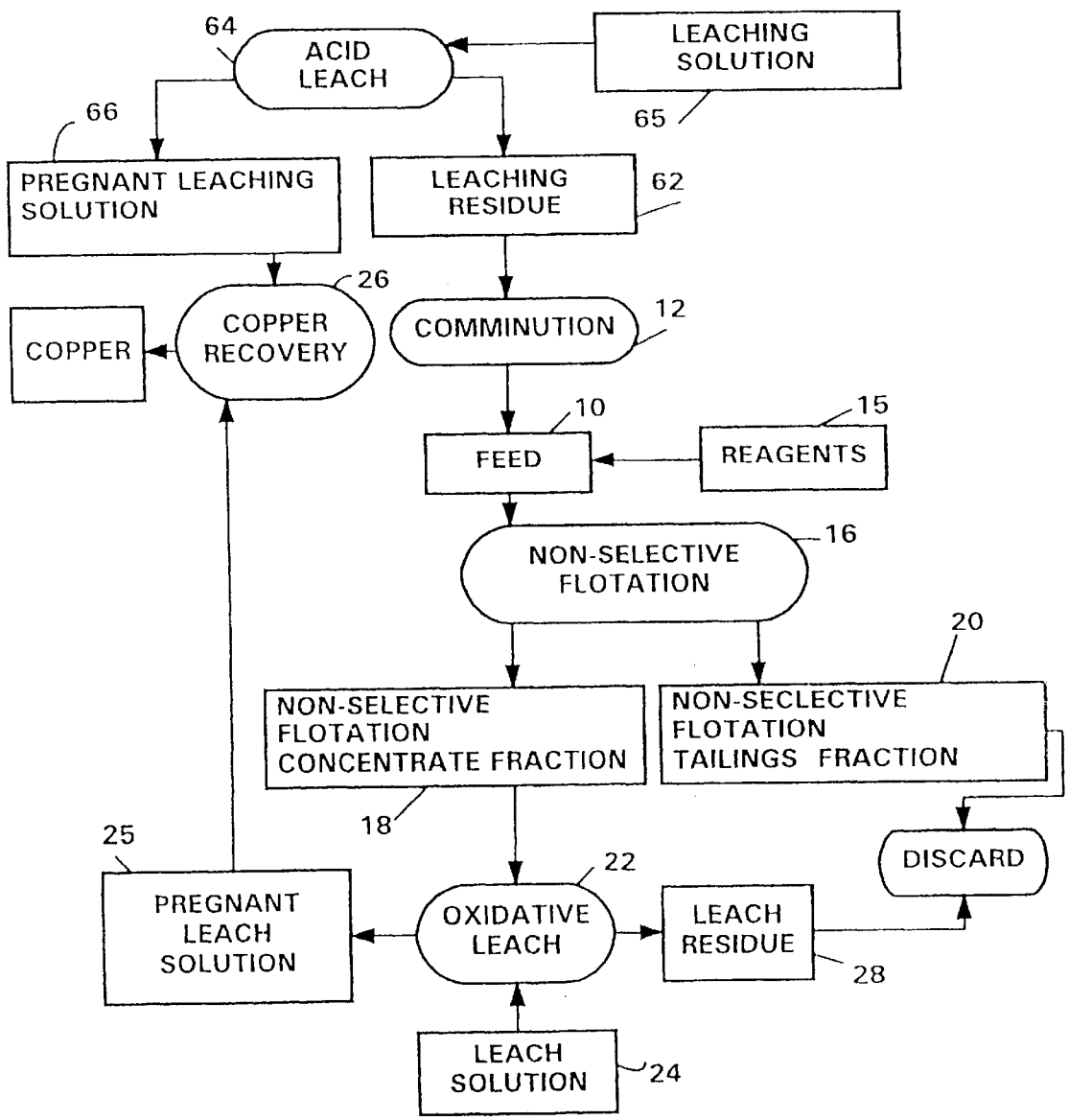
FIG. 5 is a flow schematic of another embodiment shown in FIG. 1 of a process according to the present invention.

Copper oxides of all textures are treated by the process shown in FIG. 5. As discussed below, non-selective flotation techniques may be applied to the hydrometallurgical tailings to recover the copper in any copper sulfides in the copper-containing material. Such mineralization is generally not solubilized with the copper oxides. Depending on the type of copper sulfide mineralization (e.g., chalcocite or chalcopyrite), the leaching residue can be roasted or oxidatively leached, as appropriate.

Flotation Processes

The use of non-selective flotation as shown in FIG. 1 to treat copper-containing materials is based in part on the recognition that selective flotation to produce a smelter-grade concentrate fraction necessarily causes copper losses. Copper-containing materials typically contain various sulfides such as pyrite and mixtures thereof that are associated with copper sulfides. To recover as much copper as possible, non-selective flotation conditions are employed. By using conditions conducive to the flotation of sulfide minerals generally, copper recoveries can be increased substantially over those obtained by selective flotation processes.

It has been discovered that a significant portion of copper-containing material that is not recovered in the concentrate fraction of selective flotation processes is not recovered because of a variety of factors, including: (i) certain size fractions of the copper-containing material respond poorly to selective flotation (e.g., fractions coarser than about 200 mesh are either too large to float or contain less copper, and fractions smaller than about 800 mesh are inherently slower floating) ; (ii) the exposed surface area of the copper sulfide mineral on a particle is insufficient for the particle to be floated; (iii) the copper is in the form of a copper oxide mineral (e.g., malachite, chrysocolla, azurite, etc.) or elemental copper which will not be floated by selective flotation; and (iv) the throughput of copper-containing material in a selective flotation plant is increased to increase copper production, causing a reduction in flotation time and increased copper losses thereby.

Non-selective flotation will recover a significant portion of these losses. Non-selective flotation recovers not only a greater amount of the particles having exposed copper sulfide minerals but also particles having other types of exposed sulfide minerals, such as pyrite, that are typically associated with the copper sulfide and copper oxide minerals. For example, non-selective flotation will recover a particle having only pyrite exposed on the particle surface. Such a particle can contain either unexposed copper sulfide minerals or copper oxide minerals.

The use of an oxidative leach or calcining and acid leaching after non-selective flotation removes the need for concentrates having the high grade required for smelting. The removal of this need enables a higher amount of low-grade copper particles to be included in the concentrate fraction than is desirable with selective flotation processes that produce a concentrate for a smelter. Following flotation, the oxidative leach oxidizes the copper sulfides to soluble copper compounds, which dissolve in the leach solution for later copper recovery.

Figure 2:
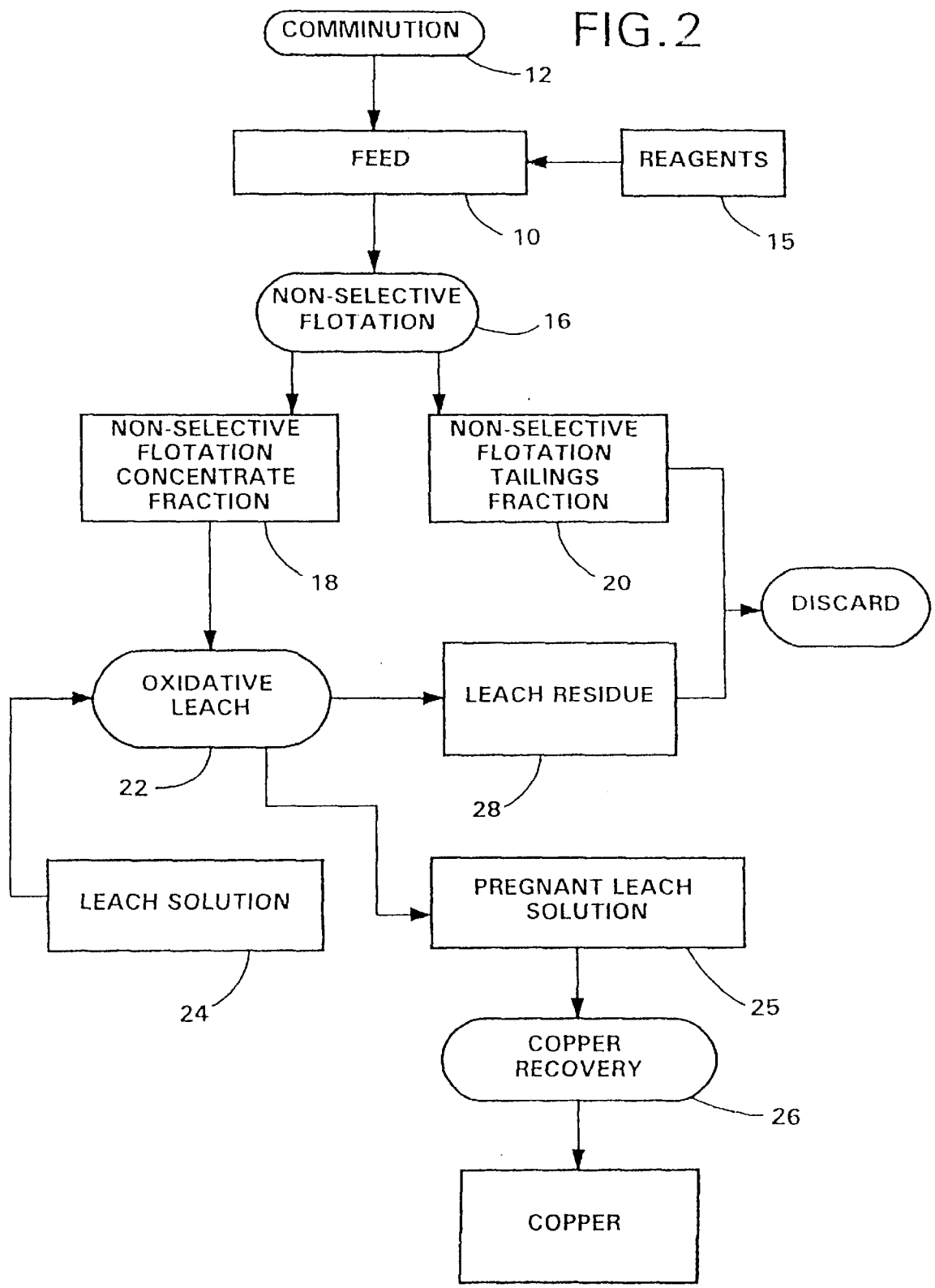
FIG. 2 is a flow schematic of an embodiment shown in FIG. 1 of a process according to the present invention.

A first embodiment of the present invention is illustrated in FIGS. 1 and 2. This aspect is preferred for fine and very fine textured copper-containing materials having chalcocite as a primary copper-containing mineral. Referring to FIG. 2, the copper-containing material is comminuted 12 to form a feed 10 in the form of a slurry having particles of a desired size distribution for non-selective flotation 16. Preferably, the particles in the feed 10 have an average size ranging below about 48 mesh (Tyler seven series). The feed 10 preferably has from about 15% to about 35% solids.

The feed 10 can include various reagents 15 to improve copper recoveries in non-selective flotation 16. The feed 10 can include a collector which increases the floatability of the sulfide minerals in the feed 10. The preferred collector is a xanthate, xanthate ester, or mixtures thereof, more preferably a xanthate or xanthate ester having an alkyl group with no less than about 4 and more desirably no less than about 5 carbon atoms in the alkyl group, and most preferably an amyl or hexyl xanthate or xanthate ester. Preferably, the collector has a concentration in the feed 10 ranging from about 0.02 to about 0.15 lbs/ton of copper-containing material and more preferably from about 0.02 to about 0.05 lbs/ton of copper-containing material.

The feed 10 can include a neutral oil to increase the hydrophobic properties of the collector, generally contacted with the feed 10 in emulsion form. Preferred neutral oils are fuel, burner gas, or diesel oil, and mixtures thereof. The concentration of the neutral oil in the feed 10 preferably is in the range from about 0.05 to about 0.2 lbs/ton of copper-containing material.

The feed 10 can include a frother to permit the formation of a froth in the flotation cell. Suitable frothers include simple alcohols, such as methyl isobutyl carbinol, glycol ethers, cresylic acid, pine oil, and mixtures thereof. The frothers preferably have a concentration in the feed 10 ranging from about 0.05 to about 0.1 lbs/ton of copper-containing material.

To prepare the feed 10 for non-selective flotation 16, the reagents 15 can be contacted with the feed 10 in a suitable flotation cell. Preferably, the feed 10 is conditioned in the flotation cell with aeration for a time ranging from about 1 to about 2 minutes until the redox potential, initially typically at about −100 to about −200 mv, is raised to a level typically ranging from about −50 to about +50 mv (platinum electrodes).

The non-selective flotation step 16 is conducted, after aeration of the feed 10 to the indicated redox potential levels, to form a separate non-selective flotation tailings fraction 20 and non-selective flotation concentrate fraction 18. Non-selective flotation 16 of the feed 10 is conducted at a suitable pH to increase the ability of the collector to attach to the sulfide minerals' surfaces. Preferably, the pH is in the from about pH 7.5 to about pH 10.5, more preferably from about pH 8.5 to about pH 10.5 and most preferably from about pH 8.5 to about pH 9.5. Preferably, lime is used to adjust the pH to suitable levels.

The non-selective flotation 16 is preferably conducted in a series of flotation cells, with a total retention time of the feed 10 ranging from about 5 to about 15 minutes. The non-selective concentrate fractions from the various flotation cells are combined to form the non-selective concentrate fraction 18.

The flotation cell can be of any suitable design. The preferred flotation cell design is discussed below.

The non-selective concentrate fraction 18 preferably contains the majority of the sulfide minerals from the feed 10. Typically, the non-selective concentrate fraction 18 contains at least about 50%, more typically about 75%, and most typically 90% by weight of the sulfide minerals other than copper sulfides in the feed 10. The non-selective flotation concentrate fraction 18 contains no less than about 15% and typically from about 50% to about 80% by weight sulfide minerals other than copper sulfides. As noted above, such sulfide minerals are generally pyrite. Such levels of sulfide minerals are acceptable because leaching is generally used for solubilizing the copper in the non-selective flotation concentrate fraction. The non-selective flotation concentrate fraction 18 preferably contains at least about 50%, more preferably at least about 75%, and most preferably at least about 90% by weight of the copper sulfide minerals from the feed 10. The non-selective flotation concentrate fraction 18 generally has a copper assay ranging from about 2% to about 10%, more generally from about 3% to about 9%, and most generally from about 4% to about 8% copper.

Oxidative Leaching Processes

The non-selective flotation concentrate fraction 18 is subjected to an oxidative leach 22 to oxidize the copper sulfides to copper compounds which are soluble in the leach solution 24. In the oxidative leach 22, the leach solution 24 can include a leaching agent, and water, to which is added the non-selective flotation concentrate fraction 18. The leach solution 24 preferably contains about 10% to about 30% by weight solids. The non-selective flotation concentrate fraction 18 preferably contains a substantial portion of the copper-containing material coarser than about 48 mesh (Tyler seven series).

The leaching agent is any liquid in which copper sulfides are soluble. The leaching agent can include solutions containing ammonia, ammonium salts, and mixtures thereof. The leach solution 24 preferably is substantially free of chlorine to reduce corrosion of equipment.

The leach solution 24 can include ammonium sulfite, typically formed by reacting sulfur dioxide with ammonium hydroxide, to assist decomposition of copper sulfides in the copper-containing material to form copper compounds soluble in the leaching agent. While not wishing to be bound by any theory, it is believed that the dissolution reactions occur according to one or more of the following equations:

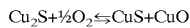
$$Cu_2S + \tfrac{1}{2}O_2 \leftrightarrows CuS + CuO$$

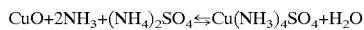
$$CuO + 2NH_3 + (NH_4)_2SO_4 \leftrightarrows Cu(NH_3)_4SO_4 + H_2O$$

It is believed that the ammonium sulfite acts as a reducing agent according to the following equations:

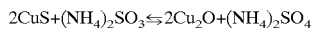
$$2CuS + (NH_4)_2SO_3 \leftrightarrows 2Cu_2O + (NH_4)_2SO_4$$

The molecular oxygen in the equations can be supplied by aeration during the oxidative leach 22 of the concentrate fraction 18.

While not wishing to be bound by any theory, it is believed that the ammonium sulfite facilitates low temperature dissolution of the copper ions and sulfide ions in the concentrate fraction 18. In the absence of ammonium sulfite and oxygen, copper sulfides are not fully oxidized to copper oxides. Typically, a significant portion of the copper sulfides is converted in the absence of ammonium sulfite to a cupric copper sulfide, such as covellite, CuS, which does not dissolve in the absence of ammonium sulfite.

In a preferred application, the concentrations of ammonia, ammonium sulfate, and ammonium sulfite in the leach solution 24 preferably are the relative amounts required by the above-noted equations to oxidize the copper sulfides in the non-selective flotation concentrate fraction 18. The ammonia concentration in the leach solution 24 before the oxidative leach 22 preferably is in the range from about 100 to about 150 gms/liter. The concentration of the ammonium sulfite depends on the copper content of the non-selective flotation concentrate fraction. Preferably, the ammonium sulfite concentration is in the range from about 5 to about 100 gms/liter and more preferably from about 5 to about 50 gms/liter.

The frequency and amount of ammonium sulfite addition is an important factor to leach efficiency. The ammonium sulfite is preferably added in stages with the majority of ammonium sulfite being added in the first or initial stage and the remainder added incrementally in the later stages.

The leaching agent and ammonium sulfite can be added to form the leach solution 24 in any form that is soluble in the leach solution 24. In particular, the sulfite can be contacted with the leach solution 24 as a solid, namely ammonium sulfite, or as a gas, namely sulfur dioxide. Sulfur dioxide hydrates when contacted with water to form ammonium sulfite. The ammonium sulfite can also be produced by calcining the sulfides in the copper-containing material obtained from the leach residue or the non-selective flotation tailings fraction.

During the oxidative leach 22, the leach solution 24 can be aerated with air at atmospheric pressure. The air can be recirculated through the leach solution 24, as desired.

The rate of aeration is an important factor in the oxidative leach 22. The rate of aeration preferably is in the range from about 2 to about 4 $ft^3/min./ft^2$ tank area.

The leach solution 24 is vigorously agitated to ensure adequate mixing of the solids and liquid with the oxygen-containing gas. Preferably, the power intensity during agitation is in the range from about 0.05 to about 0.10 $hp/ft^3$. Any suitable agitation device can be used, including a flotation cell.

The pH and temperature of the oxidative leach 22 influence the reaction rate. The pH of the leach solution 24 preferably in the range from about pH 9 to about pH 10. The temperature of the leach solution 24 preferably in the range from about 20 to about 40° C. By contrast, the temperature of a leach solution required to solubilize copper in the absence of ammonium sulfite is considerably higher, typically ranging from 60 to 90 and more typically from 70 to 75° C.

Based on the pH, temperature, and pressure above, the duration of the oxidative leach 22 preferably is in the range from about 1 to about 4 hours and more preferably from about 1 to about 2.5 hours. By contrast, the duration of the oxidative leach in the absence of ammonium sulfite is slower, typically ranging from 3 to 4 hours.

The oxidative leach 22 can be performed in any suitable reactor, particularly a tank reactor such as a flotation cell.

A byproduct of the oxidative leach 22 is ammonium sulfate. The ammonium sulfate is preferably converted into ammonia and sulfuric acid, decomposed, or recovered for sale as a fertilizer.

Figure 3:
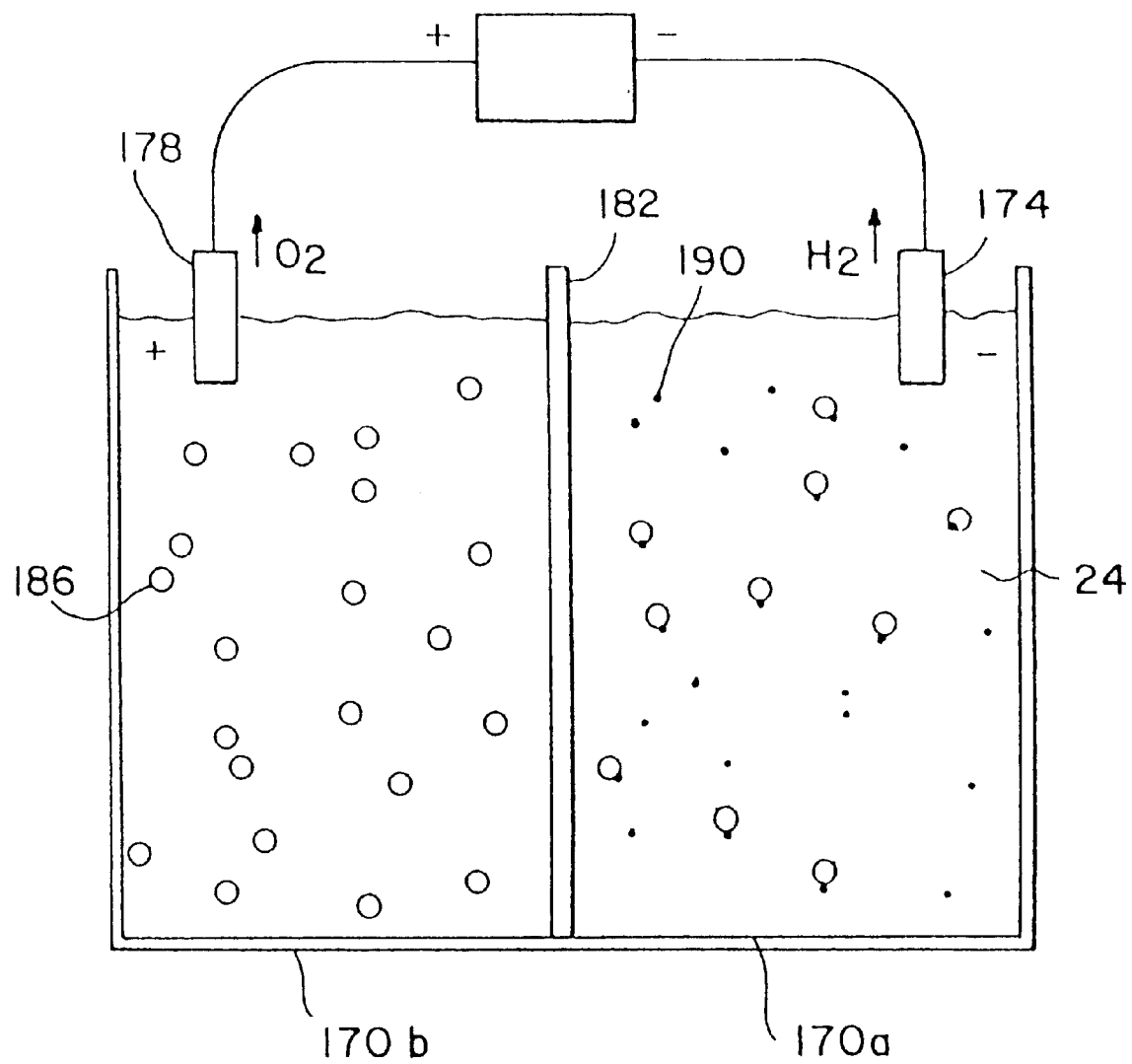
FIG. 3 is a side view of an ion selective membrane apparatus.

To decompose the ammonium sulfate into ammonia and sulfuric acid, a portion of the pregnant leach solution 25 or a derivative thereof (e.g., a raffinate solution) after copper recovery 26 is subjected to electrolysis across an ion selective membrane. Referring to FIG. 3, the pregnant leach solution 25 or a derivative thereof (e.g., a raffinate solution) is placed in a first compartment 170a containing an anode 174. A second compartment 170b contains the cathode 178 and is separated from the first compartment by an ion selective membrane 182. When a current is passed between the anode and cathode through the pregnant leach solution 25 or a derivative thereof (e.g., a raffinate solution), the ammonium sulfate is converted into ammonium and sulfate ions. The sulfate ions 186 pass through the ion selective membrane 182 to the cathode 178 where the sulfate ions 186 are converted into hydrosulfuric acid. The ammonium ions 190 migrate to the anode 174 where the ammonium ions 190 are converted into ammonia. The ammonium ions 190 do not pass through the ion selective membrane 182. It is believed that the conversion occurs according to the following equation:

$$H_2O+(NH_4)_2SO_4 \rightarrow H_2\uparrow + \tfrac{1}{2}O_2\uparrow + 2NH_3 + H_2SO_4$$

As will be appreciated, an ion selective membrane 182 can be selected not only to pass the sulfate ions 186 and not the ammonium ions 190 but also to pass the ammonium ions 190 and not the sulfate ions 186. In the former case, the pregnant leach solution 25 or a derivative thereof (e.g., a raffinate solution) is placed in the compartment that contains the anode 174 (if the ion selective membrane 182 passes the sulfate ions 186) or in the latter case in the compartment that contains the cathode 178 (if the ion selective membrane 182 passes the ammonium ions 190).

For higher purity sulfuric acid and ammonia, the pregnant leach solution 25 or a derivative thereof (e.g., a raffinate solution) can be placed in the first or second compartments 170a, b in a first electrolytic cell and then into the second or first compartments 170b, a, respectively, in a second electrolytic cell. In this manner, the ammonia and sulfuric acid that is collected forms in the compartment adjacent to the compartment in which the leach solution is placed. This can reduce the likelihood that impurities can migrate through the ion selective membrane 182.

The sulfuric acid and ammonia may be selectively recovered and either sold or used as reagents.

Alternatively, the ammonium sulfate can be decomposed with lime to form calcium sulfate for disposal and ammonia for recycle to the oxidative leach 22.

In a second embodiment of the oxidative leach 22, the leaching agent is an acid, preferably sulfuric acid, and the leach solution 24 contains ferric sulfate to oxidize sulfide sulfur and cuprous copper. While not wishing to be bound by any theory, it is believed that the oxidation of the sulfides occurs according to the following equation:

$$Cu_2S+Fe_2(SO_4)_3=CuSO_4+CuS+2FeSO_4$$

$$CuS+Fe_2(SO_4)_3=CuSO_4+S^0$$

Copper oxides will be dissolved in the leaching agent by the following equation:

$$CuO+H_2SO_4=CuSO_4+H_2O$$

Generally, the amount of leaching agent and ferric sulfate in the leach solution 24 is the amount required by the above-noted equations to oxidize the sulfide sulfur and cuprous copper in the non-selective flotation concentrate fraction 18. The leaching agent concentration in the leach solution 24 preferably is in the range from about 0.5 to about 1.5 molar. The concentration of the ferric ion in the leach solution 24 preferably is in the range from about 25 to about 100 gms/liter.

The oxidative leach step 22 is conducted preferably at temperatures ranging from about 45° C. to about 90° C. for a time ranging from about 1 to about 3 hours. Intensive agitation and aeration are desirable to reduce the temperature requirements.

Intensive agitation and aeration further help maintain the iron sulfate as a ferric salt according to the following equations:

$$2FeSO_4+SO_2+O_2=Fe_2(SO_4)_3$$

$$4FeSO_4+2H_2SO_4+O_2=2Fe_2(SO_4)_3+2H_2O$$

Otherwise, the iron sulfate will be reduced to the ferrous salt as the sulfide sulfur is oxidized.

After the oxidative leach 22, the copper recovery 26 from the pregnant leach solution 25 is realized by suitable techniques, including solvent extraction and electrowinning. Solvent extraction and electrowinning are preferred for reasons of cost and simplicity of operation. The non-selective flotation tailings fraction 20 and leach residue 28 are discarded.

Figure 4:
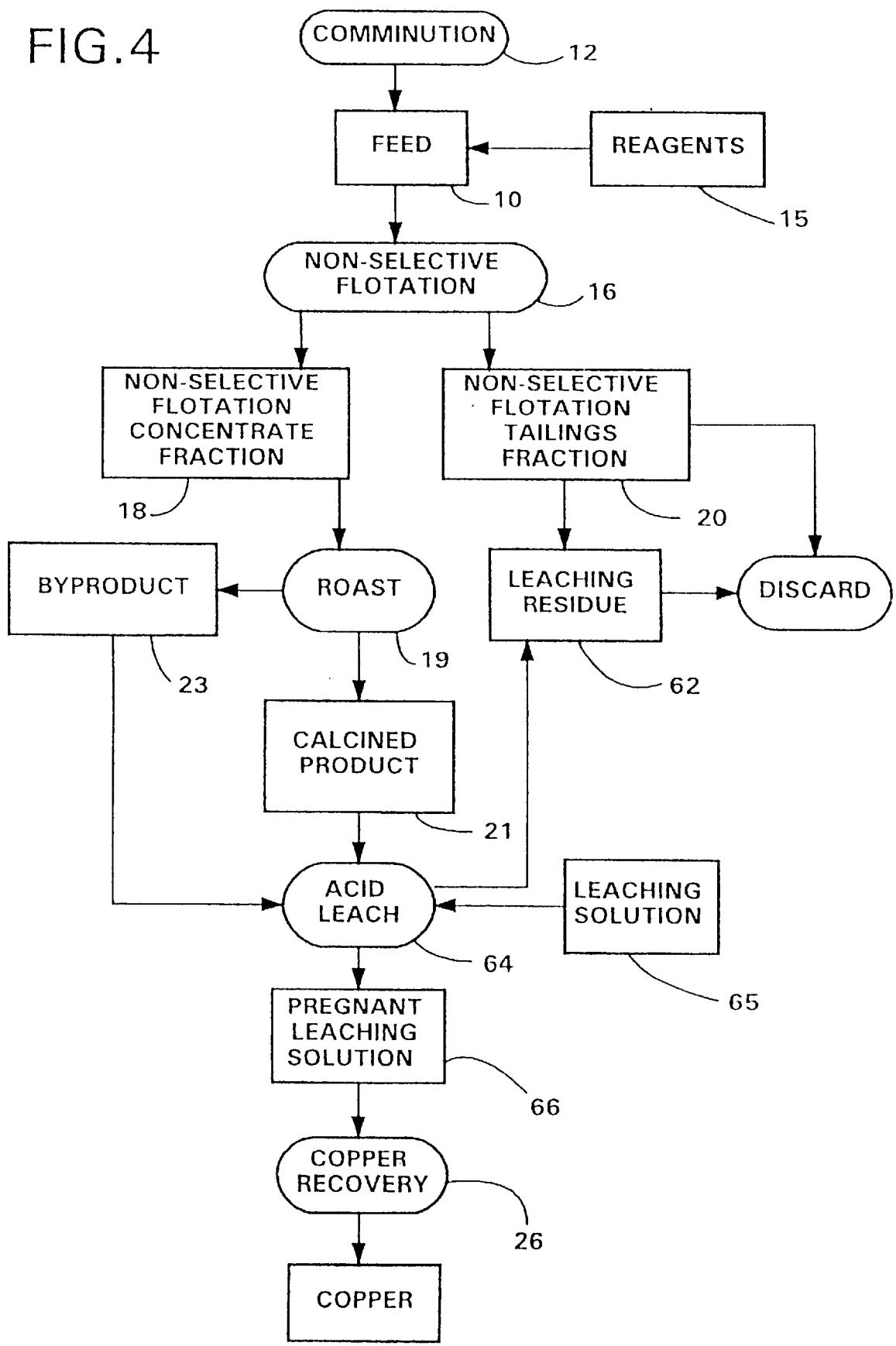
FIG. 4 is a flow schematic of another embodiment shown in FIG. 1 of a process according to the present invention.

Referring to FIG. 1, for copper-containing materials having chalcopyrite as the primary copper-containing mineral, the very fine and fine textured copper-containing material can be treated by the copper recovery process shown in FIG. 4. The copper-containing material is comminuted 12 to form feed 10. The feed 10 is subjected to non-selective flotation 16 as described above to form a non-selective flotation concentrate fraction 18 and non-selective flotation tailings fraction 20.

Roasting Processes

The non-selective flotation concentrate fraction 18 is subjected to a roast 19 to form a calcined product 21 and byproduct 23. The roast 19 generally occurs in a fluidized bed (not shown) at temperatures ranging from about 500 to about 700° C. The fluidizing gas preferably contains molecular oxygen and more preferably is air. The flow rate of the fluidizing gas through the fluidized bed preferably is in the range from about 15 to about 50 cm³/sec/cm². While not wishing to be bound by any theory, it is believed that the calcination reaction in the fluidized bed proceeds according to the following equation:

$$2CuFeS_2+6\tfrac{1}{2}O_2=2CuO+Fe_2O_3+4SO_2$$

Because the calcination reaction is exothermic, the temperature in the fluidized bed is controlled by suitable heat removal methods. Preferably, heat removal is effectuated by feeding the non-selective flotation concentrate fraction to the fluidized bed as a slurry, spraying water on the fluidized bed, and/or using heat exchangers in the fluidized bed.

Cyclones (not shown) are preferably positioned downstream of the fluidized bed to recover the portion of the calcined product 21 entrained in the fluidizing gas.

The calcined product 21 is subjected to an acid leach 64 to solubilize the oxidized copper in the leaching solution 65. Any suitable acid may be used in the leaching solution 65, preferably a sulfuric acid byproduct 23 from the roast 19. The acid leach 64 can involve any suitable leaching technique, preferably agitation leaching. The copper is recovered from the pregnant leaching solution 66 by suitable techniques.

Other Process Configurations

FIG. 5 illustrates an embodiment of the present invention for treating the leaching residue 62 from an acid leach 64 to solubilize copper oxides. Non-selective flotation can substantially improve copper recoveries by recovering copper sulfides in the leaching residue 62 that are generally not oxidized in the acid leach 64. The leaching residue 62 is normally discarded without recovery of the copper sulfide minerals.

The acid leach 64 can be conducted by suitable methods, preferably agitation leaching, to form a pregnant leaching solution 66 and the leaching residue 62. The pregnant leaching solution 66 is treated in a copper recovery step 26 to recover copper.

The leaching residue 62 is treated by non-selective flotation 16. Non-selective flotation 16 produces the nonselective flotation concentrate fraction 18 and non-selective flotation tailings fraction 20. If necessary, the leaching residue 62 is comminuted 12 to form feed 10 having the appropriate size distribution for non-selective flotation 16.

The non-selective flotation concentrate fraction 18 is subjected to the oxidative leach 22 to produce a pregnant leach solution 25 and leach residue 28. Alternatively, if the copper-containing material contains a substantial amount of chalcopyrite, the non-selective flotation concentrate fraction 18 may be treated as shown in FIG. 4. The pregnant leach solution 25 and the pregnant leaching solution 66 are treated in the copper recovery step 26 to recover the copper. The leach residue 28 and the non-selective flotation tailings fraction 20 are discarded.

Figure 6:
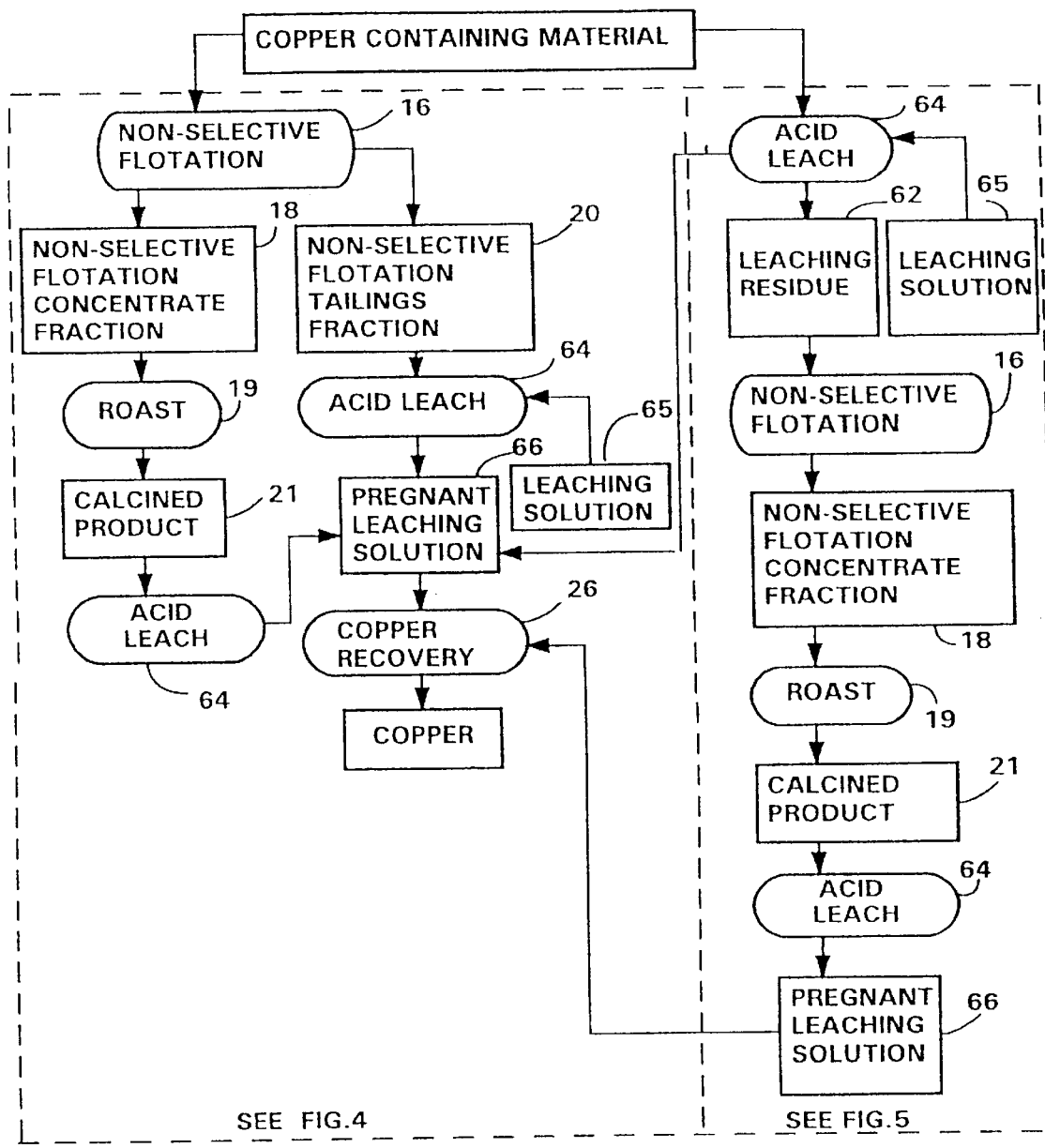
FIG. 6 is a flow schematic of another embodiment based on FIGS. 4 and 5.

Referring to FIG. 6, a process is depicted for copper-containing materials containing substantial and varying proportions of copper sulfide and oxide minerals. Copper-containing material with copper sulfides being a majority of the copper mineralization is treated by the circuit of FIG. 4 except that the non-selective flotation tailings fraction 20 is subjected to acid leach 64 to recover copper oxides. Copper-containing material with copper oxides being a majority of the copper mineralization is treated by the circuit of FIG. 5 using a roast 19 and acid leach 64 rather than an oxidative leach 22 for copper recovery.

Figure 7:
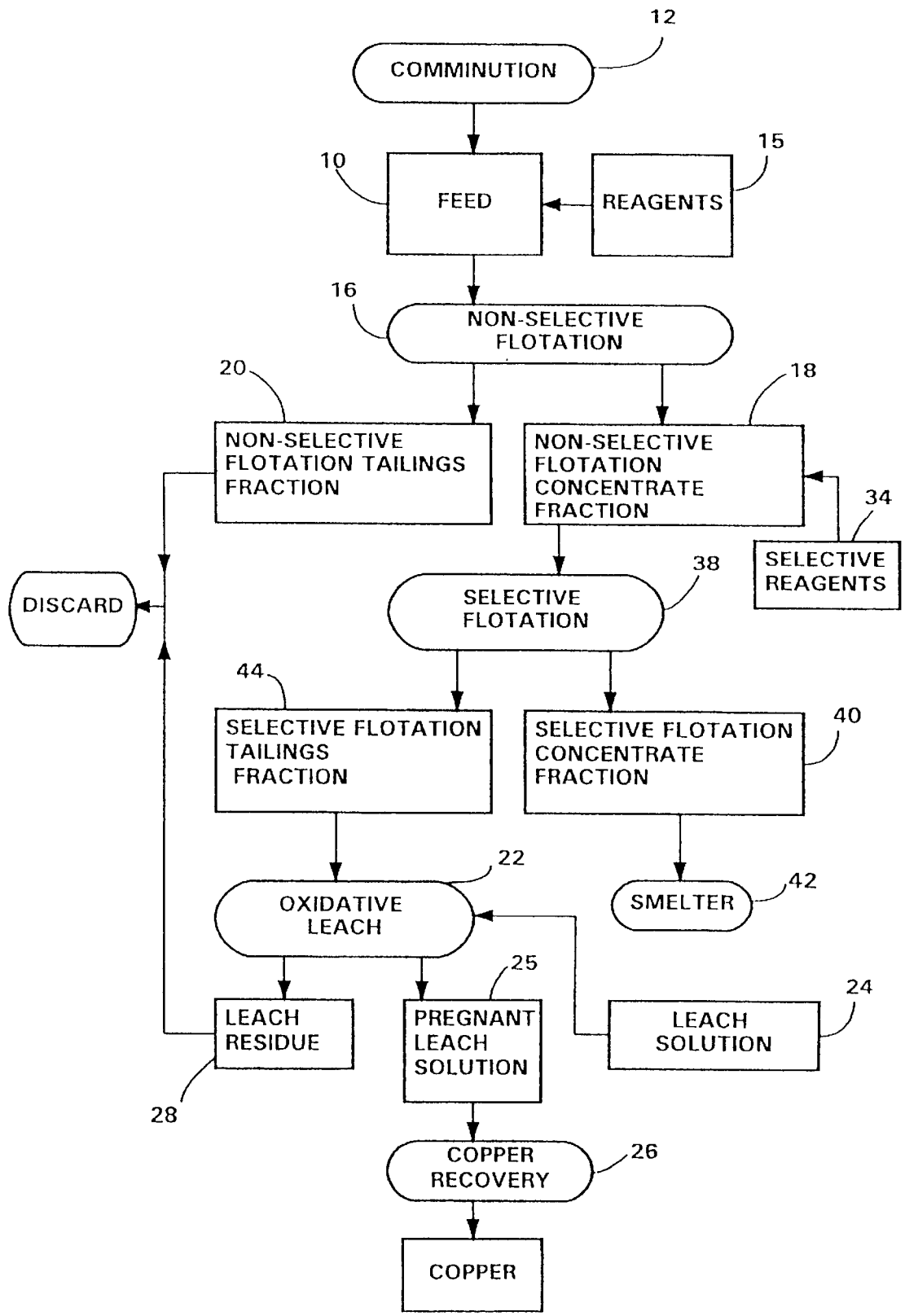
FIG. 7 is a flow schematic of another embodiment of a process according to the present invention.

FIG. 7 illustrates another embodiment of the present invention for producing a selective flotation concentrate fraction for a smelter. This embodiment is applicable where a smelter will be used to recover a portion of the copper.

Referring to FIG. 7, the copper-containing material is comminuted 12 to form feed 10. The feed 10 is subjected to non-selective flotation 16 to form a non-selective flotation tailings fraction 20 and non-selective flotation concentrate fraction 18.

In selective flotation 38, the conditions are selected to suppress the flotation of sulfide minerals other than copper sulfide minerals. The non-selective flotation concentrate fraction 18 is combined with selective reagents 34. The selective reagents 34 include collectors. The collectors are preferably dithiophosphates having ethyl or propyl groups and esters thereof. Lower molecular weight, as opposed to higher molecular weight, dithiophosphates and esters thereof are known to substantially reduce the flotation of sulfides other than copper sulfides, such as pyrite. The concentration of the collectors in the non-selective flotation concentrate fraction 18 preferably is in the range from about 0.02 to about 0.05 lbs/ton of copper-containing material.

The selective reagents 34 can include a frother as noted above. The concentration of the frother in the non-selective flotation concentrate fraction 18 typically is in the range from about 0.02 to about 0.05 lbs/ton of copper-containing material.

The selective reagents 34 can also include a pyrite depressant to suppress the flotation of pyrite. The pyrite depressant is preferably lime to provide a pH from about 10.5 to about 11.5.

The selective flotation concentrate fraction 40 contains a reduced amount of sulfides, compared to non-selective flotation concentrate fraction 18. The selective flotation concentrate fraction 40 typically contains no more than about 40% by weight of the sulfides other than copper sulfides (e.g., pyrite) in a feed material, such as the non-selective flotation concentrate fraction 18 in FIG. 7. The selective flotation concentrate fraction 40 generally has an assay of sulfides other than copper sulfides of less than about 15%.

The selective flotation concentrate fraction 40 can be delivered to a smelter 42. The selective flotation tailings fraction 44 is subjected to the oxidative leach 22 as described above. The leach residue 28 is discarded along with the non-selective flotation tailings fraction 20. Alternatively, to recover chalcopyrite the selective flotation tailings fraction 44 may be subjected to a roast 19 and acid leach 64 to recover the copper contained therein.

Figure 8:
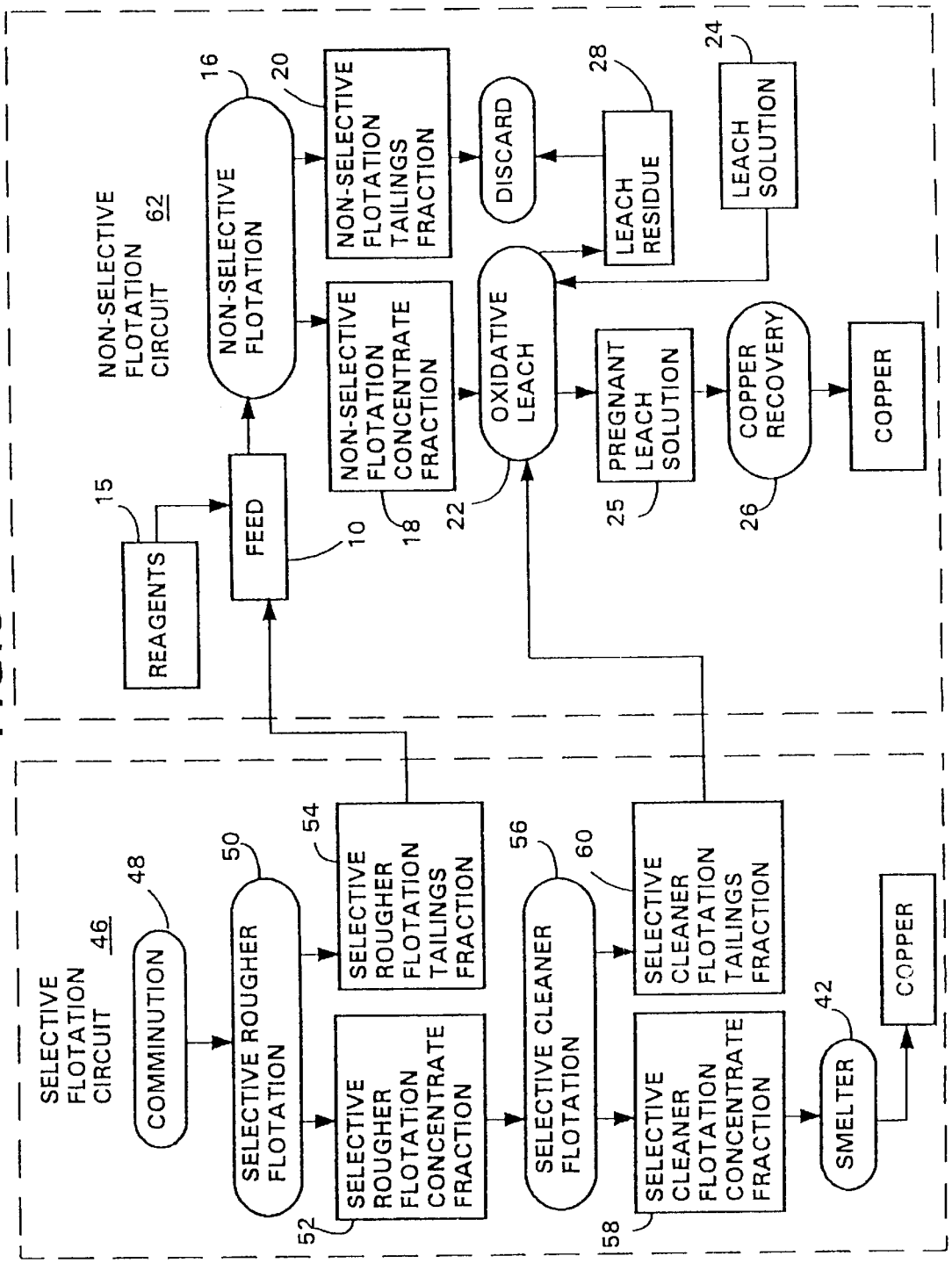
FIG. 8 is a flow schematic of another embodiment of a process according to the present invention.

FIG. 8 illustrates an embodiment of the present invention for retrofitting a conventional selective flotation circuit. The non-selective flotation circuit can substantially improve copper recoveries by processing selective rougher flotation tailings and selective cleaner flotation tailings fractions that would normally be discarded.

Referring to FIG. 8, selective flotation circuit 46 includes the following steps: (i) comminution 48; (ii) selective rougher flotation 50 to form a selective rougher flotation concentrate fraction 52 and selective rougher flotation tailings fraction 54; (iii) selective cleaner flotation 56 of the selective rougher flotation concentrate fraction 52 to form a selective cleaner flotation concentrate fraction 58 and selective cleaner flotation tailings fraction 60; and (iv) treatment of the selective cleaner flotation concentrate fraction 58 by a smelter 42 to recover the copper. In certain process configurations, the selective rougher flotation concentrate fraction 52 is recomminuted and the non-selective flotation tailings fraction 20 subjected to size separation, such as by a cyclone, with the coarse fraction also being recomminuted. The recomminuted materials are subjected to selective cleaner flotation 56. In another process configuration, the selective cleaner flotation concentrate fraction 58 is partially or completely treated by the oxidative leach 22 with little or none of the concentrate fraction 58 being sent to the smelter 42. This alternative is desirable in some applications where inadequate smelter capacity is available or smelter emissions are a concern. The selective rougher flotation 50 and selective cleaner flotation 56 are substantially the same as selective flotation 38 as described above.

The selective rougher flotation tailings fraction 54 is treated by the non-selective flotation circuit 62 to produce a non-selective flotation concentrate fraction 18 and non-selective flotation tailings fraction 20.

The non-selective flotation concentrate fraction 18 and selective cleaner flotation tailings fraction 60 are subjected to an oxidative leach 22. Alternatively, if the copper-containing material contains a substantial amount of chalcopyrite, the non-selective flotation concentrate fraction 18 may be treated as shown in FIG. 4. The pregnant leach solution 25 is treated by suitable methods in the copper recovery step 26 to recover the copper. The leach residue 28 and the non-selective flotation tailings fraction 20 are discarded.

Flotation Cell

The present invention further includes a flotation cell for improved mineral recovery. The flotation cell is based on the discovery that, contrary to the teachings of the art, the stirred tank principle of existing flotation cells provides inadequate contact between the bubbles and particles in the slurry. The impeller and stator in conventional flotation cells radially disperses the particles and water to be separated in the flotation cell and gas bubbles outward into the tank, with significant loss of particle/bubble contact probable. This causes coarse middling, surface oxidized, and slower floating particles to be discharged from the cell as tailings. This reduces the amount of copper recovered in the concentrate in any one cell and therefore requires treatment of a metal-containing material in a multiplicity of cells to obtain acceptable metal recoveries, which significantly increases capital and operating costs.

The present invention confines the impeller discharge to a confined volume within the cell and directs the discharge upwards directly into a subfroth region from which hydrophobic particles enter into the froth. Thus, the flotation cell of the present invention ejects the discharge into the subfroth and below the froth. In this manner, a greater degree of contact between bubbles and particles persists in the region below the froth, e.g., subfroth, relative to existing cells. Thus, there is a greater opportunity for all particles, coarse and fine, to be lifted into the froth by rising gas bubbles. Existing cells, in contrast, do not have a subfroth region because of inadequate confinement of the gas and particles. Rather, such cells have a slurry typically containing 20% gas by volume contacting the froth directly with no intervening subfroth region.

One embodiment of the flotation cell of the present invention is a flotation column that eliminates the need for an impeller to provide the bubble/particle contacting.

The flotation cell of the present invention is not limited to copper-containing materials. It can be used to separate any particles having different surface properties. Specifically, it can be used to separate particles that either naturally or as treated have differing hydrophobic and/or hydrophilic properties.

Referring to FIGS. 9 and 10, an embodiment of a flotation column 80 includes an eductor assembly 84 and a separator assembly 88. The eductor assembly 84 includes a pump 92 to pressurize the feed 10 and an eductor 96 to contact a gas 124, such as air, with the feed 10 to form an aerated slurry 104. The separator assembly 88 includes a vessel 100 to contain the aerated slurry 104 and a conduit 108 to introduce the aerated slurry 104 into the vessel 100.

The feed 10 is a mixture of the hydrophobic particles 116 and hydrophilic particles 112 to be separated and a liquid 120. The liquid 120 is normally water. Preferably, substantially all of the particles 112, 116 have a size less than about 35 mesh (Tyler seven series) but more than a few microns. The feed 10 is preferably from about 20 to about 35% by weight solids with the remainder being the liquid.

As noted above, the feed 10 can include suitable additives to enhance the separation of the particles 112, 116. By way of example, the feed 10 can include suitable collectors, neutral oils, and frothers. The flotation cell is particularly effective in recovering metal sulfides under nonselective flotation conditions.

The gas 124 is preferably air.

The pump 92 can be any pump capable of transporting the feed 10 to the separator assembly 88. The pump 92 is preferably a suitable pump capable of handling and transporting a slurry.

The eductor 96 is preferably located downstream of the pump 92. The eductor 96 is any device that can contact the gas 124 with the feed 10 to form the aerated slurry 104. It is preferred that the aerated slurry 104 include an amount of gas ranging from about 25 to about 35% by volume and an amount of solids preferably ranging from about 20 to about 35% by weight. Alternatively, the eductor 96 and pump 92 can be replaced by a pump that can disperse the gas into the feed 10 at the suction intake to the pump 92.

The vessel 100 is located downstream of the eductor 96. The vessel 100 is any suitable container for the aerated slurry 104. The vessel 100 can be any size and shape depending upon the particular application. The volume of the vessel 100 is selected based upon the desired capacity of the separator assembly 88. Preferably, the vessel 100 is substantially cylindrical as illustrated in FIG. 10.

The conduit 108 is preferably centrally located within the vessel 100 and defines a mixing zone 132 for further contacting the gas bubbles 128 with the hydrophobic particles 116 in the aerated slurry and a discharge zone 136 for collecting a small unfloated fraction of hydrophobic particles 116 and substantially all of the hydrophilic particles 112. The mixing zone 132 is located within the conduit 108 and extends from the eductor 96 to the outlet of the conduit 108 into the vessel 100. The mixing zone 132 is the defined region in the vessel 100 for further contacting or mixing of gas bubbles 128 with hydrophobic and hydrophilic particles 116. The discharge zone 136 is located in the area between the conduit 108 and the vessel 100 but below the subfroth 144. The discharge zone 136 is an area in the vessel 100 for gravity separation of hydrophobic particles 116 from hydrophilic particles 112.

The discharge zone 136 contains a smaller amount of gas and solids than the mixing zone 132. In contrast to the mixing zone 132, the discharge zone 136 without the presence of the nozzles 140 includes an amount of gas that is typically no more than about 10% by volume and more typically no more than about 5% by volume. With the nozzles 140, the discharge zone 136 typically includes no more than about 15% by volume gas.

The conduit 108 can be any shape but preferably is the same shape as the interior of the vessel 100. In typical applications, the conduit 108 will be substantially cylindrical in shape. Rectangular conduits 108 are typically not preferred because they can accumulate particles in their corners, especially in flotation cells having a stator or other mechanical mixing device.

The dimensions of the conduit 108 and therefore of the mixing zone 132 depend upon the size of the vessel 100. The mixing zone 132 preferably has a cross-sectional area normal to the direction of flow that is from about 20 to about 45% and more preferably from about 25 to about 40% of the total cross-sectional area of the vessel 100 normal to the direction of flow. The width of the mixing zone 132 preferably ranges from about 20 to about 65% and more preferably from about 25 to about 60% of the vessel width. The length of the mixing zone 132 is preferably sufficient to provide a total residence time of the aerated slurry 104 in the mixing zone 132 and subfroth region 144 that preferably is about 15 to about 35 and more preferably about 25% of the total residence time in the vessel 100. Specifically, the residence time in the mixing zone and subfroth region ranges from about 1.5 to about 5 minutes, more preferably from about 2 to about 4 minutes, and most preferably from about 2 to about 3 minutes. The height of the conduit 108 above the bottom of the vessel typically ranges from about 50 to about 85%, more preferably from about 60 to about 80%, and most preferably from about 70 to about 80% of the distance from the bottom of the vessel to the top of the froth 148. The conduit 108 can be telescopic to provide a plurality of adjustable heights. The upper outlet of the conduit 108 defines the lower surface of the subfroth 144. The height of the subfroth 144 preferably ranges from about 10 to about 35 and more preferably from about 15 to about 30% of the distance from the bottom of the vessel to the top of the froth 148. The height of the froth 148 preferably ranges from about 10 to about 20 and more preferably from about 10 to about 15% of the distance from the bottom of the vessel to the top of the froth 148. Based on the above-noted dimensions, the mixing zone 132 preferably ranges from about 1 to about 30 and more preferably from about 5 to about 25% of the total vessel volume.

The separator assembly 88 can include a plurality of nozzles 140 for injecting gas 124 into the aerated slurry 104 in the discharge zone 136. Preferably, the nozzles 140 are located around the periphery of the mixing zone 132 in the discharge zone to cause additional contact between the particles 112, 116 and gas bubbles 128 in the discharge zone to further enhance the separation of hydrophobic particles 116 from hydrophilic particles 112.

In an alternative embodiment, a portion 14 of the feed 10 is introduced into the vessel 100 at the subfroth 144. In this embodiment, the flotation cell preferably has the nozzles 140 located in the discharge zone below the subfroth 144 to inject additional gas 124 into the aerated slurry 104. The feed portion 14 is typically not aerated before contact with the subfroth 144.

The operation of the flotation cell will now be described. The feed 10 is transported by the pump 92 to the eductor 96. In the eductor 96, the gas 124 is contacted with the feed 10 to form the aerated slurry 104. It is believed that the gas 124 is present in the aerated slurry 104 as a plurality of gas bubbles 128.

From the eductor 96, the aerated slurry 104 is discharged into the mixing zone 132 where the gas bubbles 128 rise upward through the aerated slurry 104 and contact the hydrophobic particles 116. The hydrophobic particles 116 attach to the bubbles 128 and are carried first into the subfroth 144 and second into the froth 148.

The subfroth 144 is the area in the vessel 100 in which the hydrophobic and hydrophilic particles 116, 112 are discharged from the conduit 108. The subfroth region underlies substantially all, and more typically all, of the froth region. While not wishing to be bound by any theory, it is believed that the subfroth 144 is an active area in which there is a high degree of movement of the hydrophobic and hydrophilic particles 116, 112 and the bubbles 128. The movement further facilitates the attachment of the hydrophobic particles 116 to the gas bubbles 128. It is preferred that the majority and more preferably all of the hydrophobic and hydrophilic particles 116, 112 in the aerated slurry 104 be discharged into the subfroth 144. This ensures that a greater amount of the hydrophobic particles are carried into the froth 148 compared to existing flotation devices. Preferably, no less than about 90%, more preferably no less than about 95%, and most preferably no less than about 97.5% of the hydrophobic particles are contacted with the subfroth 144.

The rate of discharge of the aerated slurry 104 into the subfroth 144 is an important contributor to the flotation efficiency of the column. As will be appreciated, the discharge rate depends upon the diameter of the conduit 108.

The subfroth 144 typically has a volumetric percentage of gas 124 to slurry ranging from about 35 to about 65%, more preferably from about 40 to about 60%, and most preferably from about 45 to about 60%. The slurry in the subfroth typically contains from about 20 to about 35% by weight solids. This is considerably more gas than is present in existing cells below the froth. Such cells typically contain no more than about 20% gas in the slurry located below the froth.

From the subfroth 144, the gas bubbles 128 and attached hydrophobic particles 116 pass upwards into the froth 148. In contrast to the subfroth 144, the froth 148 is a relatively quiescent volume of aerated slurry 104. In the froth 148, the volumetric percentage of gas 124 to slurry ranges from more than about 70 to about 85%. The hydrophobic particles 116 are removed with the froth 148 to form a concentrate fraction 152.

From the subfroth 144, the hydrophilic particles and a small fraction of the hydrophobic particles in the aerated slurry 104 that are not carried upward into the froth pass into the discharge zone 136. The hydrophilic particles 112 and remaining hydrophobic particles 116 that are not attached to a gas bubble 128 move downward towards the bottom of the vessel 100. Gas bubbles 128 from the nozzles 140 contact additional hydrophobic particles 116 and transport the hydrophobic particles 116 upward first into the subfroth 144 and second into the froth 148.

The hydrophilic particles 112 are discharged at the bottom of the vessel 100 to form a tailings fraction 156. The tailings fraction 156 is removed for additional treatment, such as in another flotation vessel, or for disposal.

The flotation cell of the present invention is characterized by high recoveries of hydrophobic particles. Typically, the froth will contain no less than about 85, more preferably no less than about 90, and most preferably no less than about 95% of the hydrophobic particles in the feed 10.

Figure 12:
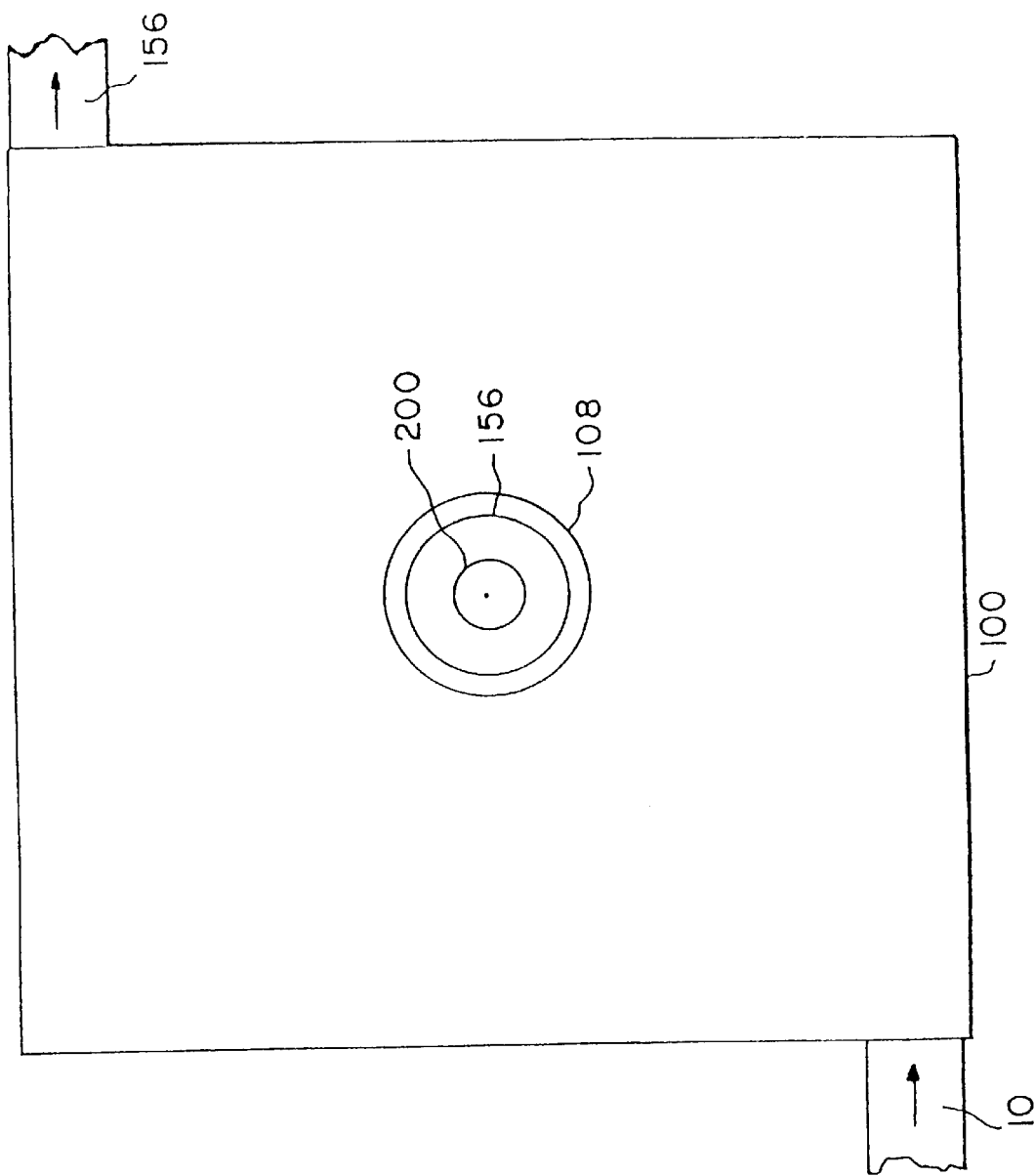

An embodiment of a mechanical flotation cell according to the present invention is depicted in FIGS. 11 and 12. Unlike the flotation column, the mechanical flotation cell has a impeller to provide mechanical agitation and mixing of the particles, water and gas.

In operation, the stator 156 creates a suction in the mixing zone 132 that draws the feed 10 and gas 124 into the mixing zone 132. The stator 156 further creates turbulence in the mixing zone 132 to cause interaction between the gas bubbles 128 and hydrophobic particles 116. Unlike the prior embodiment, the gas bubbles 128 and feed 10 are first contacted in the mixing zone 132 in the flotation cell rather than upstream of the cell.

Referring to FIG. 11, the feed 10 is fed through a first conduit 160 into the mixing zone 132 in the conduit 108. Gas 124 is injected into the mixing zone 132 through a shaft 200. The impeller 156 in the mixing zone 132 induces turbulence in the feed 10 to form the aerated slurry 104 and induce contact between the hydrophobic particles 116 and gas bubbles 128.

The impeller 156 rotates about the shaft 200 and forces the aerated slurry 104 upward in the mixing zone 132 through the upper outlet of the conduit 108 and into the subfroth 144. Hydrophobic particles 116 attached to gas bubbles 128 rise from the subfroth 144 into the froth 148 for recovery as the concentrate fraction 152.

Hydrophilic particles 112 move downward from the subfroth 144 into discharge zone 136 and are collected and discharged from the bottom of the vessel 100 as the tailings fraction 156.

The preferred dimensions of the flotation column of FIGS. 9 and 10 and the mechanical flotation cell of FIGS. 11 and 12 can differ significantly. Unlike the mechanical cell, the flotation column is substantially free of mechanical agitation or mixing and relies upon the flow of compressed air through the cell for agitation and flotation. Compared to the mechanical flotation cell, the column cell has a lower power input, typically no more than about 0.01 hp/cubic foot of vessel volume (for the compressor) compared to a power input for the mechanical flotation cell ranging from about 0.03 to about 0.10 hp/cubic foot of vessel volume (for the mechanical agitator and/or compressor). Both the flotation column and mechanical cell have a gas input typically ranging from about 3 to about 5 cubic feet of gas/square foot of vessel area. Because of the lower power input of the flotation column, the column requires a longer residence time in the mixing zone and subfroth than the mechanical flotation cell to realize adequate particle/bubble contact and therefore acceptable recoveries. Thus, the mechanical agitation in the mechanical cell significantly enhances particle-to-bubble contact in the mixing zone, and, as a result, particles in the flotation column are generally slower floating than in the mechanical cell. To provide adequate column capacity, the mixing zone in the column is generally a larger portion of the total vessel volume than the mixing zone of the mechanical cell.

The flotation column will typically have a higher height-to-diameter ratio than the mechanical cell. The flotation column, for example, typically has a height-to-diameter ratio that is more than about 4:1 while the ratio for the mechanical cell typically is no more than about 1.5:1. Typical dimensions for the column cell are a height ranging from about 25 to about 40 feet and a width of around 10 feet and for the mechanical cell a height of around 10 feet and a width of around 15 feet.

Based on the foregoing, the preferred relative dimensions of the mechanical cell can significantly differ from the preferred relative dimensions of the flotation column set forth above. By way of example for the mechanical cell, the mixing zone 132 preferably has a cross-sectional area normal to the direction of flow that is from about 15 to about 30 and more preferably from about 15 to about 25% of the total cross-sectional area of the vessel 100 normal to the direction of flow. The width of the mixing zone 132 preferably ranges from about 20 to about 60, more preferably from about 30 to about 55, and most preferably from about 30 to about 45% of the vessel width. The height of the mixing zone is preferably sufficient to provide a total residence time of the aerated slurry in the mixing zone and subfroth region that ranges from about 0.5 to about 2.5, more preferably from about 0.5 to about 2.0, and most preferably from about 0.5 to about 1.5 minutes. The height of the conduit 108 above the vessel bottom typically ranges from about 60 to about 90, more preferably from about 65 to about 85, and most preferably from about 70 to about 80% of the total distance from the vessel bottom to the top of the froth. The height of the subfroth region preferably ranges from about 5 to about 20 and more preferably from about 10 to about 15 of the total distance from the vessel bottom to the top of the froth, and the height of the froth preferably ranges from about 2.5 to about 15% of the total distance from the vessel bottom to the top of the froth. The volume of the mixing zone preferably ranges from about 10 to about 30 and more preferably from about 15 to about 25% of the total vessel volume.

In the mechanical cell, it is important that the clearance between the impeller 156 (which is attached to the vessel bottom by means of legs 210) and the interior wall of the conduit 108 be maintained to a relatively small distance. Preferably, the clearance between the end or outer perimeter of the impeller and the interior conduit wall ranges from about 5 to about 35, more preferably from about 10 to about 30, and most preferably from about 15 to about 25% of the impeller diameter.

Because of the increased bubble-to-particle contact of the flotation device of the present invention relative to existing flotation devices, the flotation device of the present invention can have a number of advantages relative to existing flotation devices. The device of the present invention can have relatively high recoveries of hydrophobic particles compared to existing devices. The high recoveries can reduce or entirely eliminate the need for a number of devices connected in series to yield acceptable recoveries. As will be appreciated, this is a common practice in the art. The device of the present invention can float particles, especially slower floating particles, at higher rates than existing devices. In existing devices, such particles generally are discarded as tailings thereby reducing metal recoveries. In contrast, the device of the present invention can float such particles relatively quickly. The subject device typically requires less time to achieve acceptable recoveries of hydrophobic particles than existing devices. Accordingly, a given device of the present invention can have a higher throughput than existing devices of the same size.

OXIDATIVE LEACHING EXAMPLES

Before discussing the various tests, it is convenient to divide the samples in the tests according to the types of material in each sample. These include, but are not limited to, the following:

1) Samples 1, 2 and 3 are non-selective concentrate fractions from selective flotation tailings as illustrated in FIG. 8.

2) Sample 4 is a non-selective flotation concentrate fraction from an ore feed as illustrated in FIG. 2.

3) Sample 5 is a selective cleaner flotation concentrate fraction as illustrated in FIG. 8.

4) Sample 6 is a selective cleaner flotation concentrate tailings fraction as illustrated in FIG. 8.

As indicated above, oxidative leaching can be carried out either with a ferric sulfate additive to a leach solution containing a suitable acid or else with a sulphur dioxide additive to a leach solution containing ammonia. In both cases, aeration is used along with intensive agitation such as is provided by flotation cells.

With the ferric sulfate additive, concentrations of ferric ion are in the range of 8–15 gms/liter and the acid component in the range of 30–60 gms/liter. Although the tests cited were carried out at 90° C., a temperature of 50° C. also gave acceptable results. Leach times were in the range of 2–4 hrs.

Concentrations of the sulphur dioxide reagents were at 5.3 and 5.4 weight percent; temperatures and pressure were ambient; and leach times from 2 to 4 hours. The results are presented in Table 1 below.

TABLE 1

| Sample | Assays % Cu | | Extraction | Conditions | | Reagents gm/L | |
|---|---|---|---|---|---|---|---|
| No. | Feed | Residue | % Cu | Time hrs | Temp. °C. | Ferric | Acid |
| 1 | 1.56 | 0.12 | 93.5 | 2 | 90 | 7.9 | 47.1 |
| 2 | 4.40 | 0.38 | 93.2 | 4* | 90 | 8.7 | 63.3 |
| 3 | 2.01 | 0.33 | 85.8 | 3 | 90 | 7.9 | 47.1 |
| 4 | 7.05 | 0.89 | 91.6 | 2 | 90 | 15.2 | 49.6 |
| 4 | 7.05 | 0.84 | 89.8 | 2 | 90 | 9.9 | 32.6 |
| | | | | | | $NH_3$ % | $SO_2$ % |
| 4 | 7.8 | 1.74 | 82.9 | 2 | 25 | 5.3 | 5.4 |
| 5 | 30.7 | 2.02 | 96.1 | 3 | 25 | 5.3 | 5.4 |
| 5 | 30.7 | 2.04 | 95.5 | 2 | 25 | 5.3 | 5.4 |
| 6 | 1.01 | 0.069 | 93.4 | 4 | 25 | 5.3 | 5.4 |

*Leaching nearly complete in 2 hrs.

FLOTATION CELL EXAMPLES

Tests were conducted in the flotation cell of FIGS. 9 and 10 under selective flotation conditions using a porphyry copper ore feed having a typical size distribution for selective flotation and an assay of 0.37% copper. The results are presented below in Table 2.

TABLE 2

COMPARISON OF FLOTATION CELLS

| CELL | PRODUCT | FLOT. TIME | ASSAYS % | DISTR. % | DISTR. CUMUL % |
|---|---|---|---|---|---|
| Conventional Flotation Cell 1cuft vol. and 10kg feed | Con. 1 | 0.5 min | 23.5 | 42.0 | 42.0 |
| | Con. 2 | 0.5 | 18.5 | 20.8 | 62.8 |
| | Con. 3 | 2.0 | 9.2 | 6.0 | 68.8 |
| | Con. 4 | 3.0 | 2.8 | 11.7 | 79.5 |
| | Tailings | | 0.08 | 19.5 | 100.0 |
| Conventional Flotation Cell 4L vol. and 1kg feed | Concentrate | 2.0 | 17.9 | 79.0 | 79.0 |
| | Tailings | | 0.08 | 21.0 | 100.0 |
| Present Invention 7.5L vol. and 1kg feed | Con. 1 | 1.0 | 23.8 | 86.4 | 86.4 |
| | Con. 2 | 2.0 | 1.8 | 9.8 | 96.2 |
| | Tailings | | 0.014 | 3.8 | 100.0 |
| Present Invention 7.5L vol. and 2kg feed | Con. 1 | 1.0 | 18.1 | 88.6 | 88.6 |
| | Con. 2 | 2.0 | 9.1 | 9.3 | 97.9 |
| | Tailings | | 0.008 | 2.1 | 100.0 |

As can be seen in Table 2, the flotation cell of the present invention recovered significantly more copper in the concentrate fraction and lost significantly less copper in the tailings fraction than the conventional flotation cells.

Tests were conducted in the flotation cell in FIG. 11 under non-selective flotation conditions using a porphyry copper ore tailings fraction as feed. The results are presented below in Tables 3 and 4.

TABLE 3

CONVENTIONAL FLOTATION CELL

| TEST | TAIL | | CONC. | | RECOVERIES | |
|---|---|---|---|---|---|---|
| No. | % Cu | % Fe | % Cu | % Fe | % Wt. | % Cu |
| 1 | 0.028 | 1.2 | 0.65 | 13.4 | 4.34 | 51.3 |
| 2 | 0.023 | 1.0 | 0.42 | 9.9 | 6.05 | 54.1 |
| 3 | 0.035 | 1.3 | 0.36 | 14.2 | 12.00 | 50.3 |
| 4 | 0.034 | 1.2 | 0.48 | 13.2 | 8.97 | 58.2 |
| 5 | 0.038 | 1.2 | 0.44 | 11.8 | 8.96 | 53.3 |
| 6 | 0.029 | 1.2 | 0.48 | 13.4 | 5.76 | 50.3 |
| 7 | 0.040 | 1.1 | 0.45 | 12.6 | 3.66 | 30.0 |
| 8 | 0.029 | 1.1 | 0.59 | 13.4 | 4.63 | 49.7 |
| 9 | 0.019 | 1.3 | 0.37 | 4.9 | 6.55 | 57.7 |
| 10 | 0.019 | 1.3 | 0.34 | 4.7 | 7.01 | 56.8 |
| 11 | 0.023 | 1.3 | 0.48 | 6.5 | 1.75 | 27.1 |
| 12 | 0.020 | 1.3 | 0.60 | 7.4 | 1.90 | 36.8 |

Average Concentrate Grade 0.47% Cu; Cu Recovery 48.0%

TABLE 4

FLOTATION CELL OF PRESENT INVENTION

| TEST | TAIL | | CONC. | | RECOVERIES | |
|---|---|---|---|---|---|---|
| No. | % Cu | % Fe | % Cu | % Fe | % Wt. | % Cu |
| 1 | 0.026 | 1.1 | 0.60 | 8.5 | 13.57 | 79.3 |
| 2 | 0.023 | 1.1 | 0.90 | 9.5 | 9.12 | 79.7 |
| 3 | 0.034 | 1.2 | 1.10 | 7.5 | 6.47 | 69.1 |
| 4 | 0.036 | 1.1 | 1.60 | 9.3 | 5.37 | 71.6 |
| 5 | 0.043 | 1.3 | 3.30 | 10.9 | 1.84 | 59.0 |
| 6 | 0.028 | 1.2 | 3.20 | 10.7 | 2.36 | 73.3 |
| 7 | 0.043 | 1.3 | 1.80 | 7.3 | 3.14 | 54.9 |
| 8 | 0.039 | 1.3 | 2.50 | 10.2 | 2.60 | 63.1 |
| 9 | 0.023 | 1.2 | 2.00 | 9.1 | 2.63 | 70.1 |
| 10 | 0.033 | 1.3 | 2.00 | 9.2 | 3.56 | 69.1 |
| 11 | 0.017 | 1.3 | 0.74 | 9.4 | 3.46 | 71.0 |
| 12 | 0.015 | 1.2 | 0.72 | 9.3 | 2.98 | 59.6 |
| 13 | 0.020 | 1.3 | 1.00 | 8.5 | 2.65 | 63.1 |
| 14 | 0.013 | 1.2 | 0.48 | 4.9 | 3.05 | 72.6 |

Average Concentrate Grade 1.57% Cu; Cu Recovery 68.3%

As can be seen from Table 4, the flotation cell of the present invention recovered significantly more copper in the concentrate fraction and had significantly less copper in the tailings fraction than the conventional flotation cell.

Further tests were conducted under selective flotation conditions to compare the embodiment of flotation cell in FIG. 11 against a conventional flotation cell on a porphyry copper ore. The results are presented below in Table 5.

TABLE 5

| | Flotation Recoveries - Percent | |
|---|---|---|
| Flotation Time Minutes | Conventional Flotation Cell | Present Invention |
| 2 | 49.2 | 60.6 |
| 4 | 53.5 | 67.4 |
| 6 | 57.8 | 74.4 |
| 10 | 62.2 | 81.7 |
| 14 | 66.7 | 89.2 |

This test further demonstrates the superior performance of the flotation cell of the present invention compared to a conventional flotation cell.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. A mechanical flotation cell, comprising:

(a) a flotation vessel having a feed input into the vessel for a liquid feedstream containing particles, a waste output for a waste stream, a product output for a product stream, and a gas input for a gas;

(b) an impeller, in communication with the feed and gas inputs, for mechanically mixing the gas and the liquid feedstream to form an aerated feedstream; and (c) an enclosure, that is contained within the flotation vessel, partitions the volume of the flotation vessel into an enclosed region enclosed by the enclosure and an exterior region external to the enclosure, and extends from a point near the bottom of the flotation vessel to a point near a froth region of the flotation vessel, for directing the flow of at least a portion of the liquid feedstream within the flotation vessel vertically, the enclosure having an input in communication with the feed input and an output in communication with the exterior region of the flotation vessel, wherein the input of the enclosure is located near the bottom of the flotation vessel and below the impeller and the output of the enclosure is located near the froth region, wherein the enclosure directs the flow of the liquid feedstream into the impeller which is located within the enclosure, and wherein the volume of the enclosed region is less than the volume of the exterior region.

2. The mechanical flotation cell of claim 1, wherein the input of the enclosure is located at a first distance from the bottom of the flotation vessel and the output end is located at a second distance from the bottom of the flotation vessel and wherein the first distance is less than the second distance.

3. The mechanical flotation cell of claim 1, wherein the input of the enclosure is located at a first distance from the top of the flotation vessel and the output end is located at a second distance from the top of the flotation vessel and wherein the first distance is more than the second distance.

4. The mechanical flotation cell of claim 1, wherein the enclosure output is located in an upper portion of the flotation vessel and the enclosure input is located in a lower portion of the flotation vessel.

5. The mechanical flotation cell of claim 1, wherein a froth region forms in each cell above the enclosure output and wherein the enclosure output is located below the froth region.

6. The mechanical flotation cell of claim 1, wherein a shaft for the impeller includes a passage for the gas and the gas input is located on the impeller in communication with the passage.

7. The mechanical flotation cell of claim 1, wherein the enclosure has a height above the bottom of the flotation vessel ranging from about 60 to about 80% of the distance from the bottom of the flotation vessel to the top of said froth region.

8. The mechanical flotation cell of claim 1, wherein the enclosure has a volume ranging from about 1 to about 30% of the total vessel volume.

9. The mechanical flotation cell of claim 1, wherein a portion of the enclosure adjacent to the impeller has a cross-sectional area normal to the direction of flow of the liquid feedstream in the enclosure ranging from about 15 to about 30% of the total cross-sectional area of the vessel normal to the direction of flow of the liquid feedstream.

10. The mechanical flotation cell of claim 1, wherein the outer perimeter of the impeller is separated from the enclosure by a distance and the distance is no more than about 30% of the diameter of the impeller.

11. The mechanical flotation cell of claim 1, wherein the enclosure and impeller are oriented about a common longitudinal axis.

12. The mechanical flotation cell of claim 1, wherein the width of a portion of the enclosure adjacent to the impeller ranges from about 20 to about 60% of the width of the flotation vessel.

13. The mechanical flotation cell of claim 1, wherein at least a portion of the enclosure is substantially cylindrical and the substantially cylindrical portion is located substantially adjacent to the impeller.

14. The mechanical flotation cell of claim 1, wherein the flotation vessel and enclosure have a common longitudinal axis.

15. The mechanical flotation cell of claim 1, wherein at least a portion of the enclosure is located above the impeller.

* * * * *